(12) United States Patent
Centonza et al.

(10) Patent No.: US 8,942,745 B2
(45) Date of Patent: Jan. 27, 2015

(54) METHODS AND APPARATUS FOR DYNAMIC CARRIER SELECTION FOR CELL BASE STATIONS

(75) Inventors: Angelo Centonza, Winchester (GB); Gunnar Mildh, Sollentuna (SE); Fredrik Gunnarsson, Linkoping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 350 days.

(21) Appl. No.: 13/502,964

(22) PCT Filed: Mar. 9, 2012

(86) PCT No.: PCT/SE2012/050264
§ 371 (c)(1),
(2), (4) Date: Apr. 19, 2012

(87) PCT Pub. No.: WO2012/169951
PCT Pub. Date: Dec. 13, 2012

(65) Prior Publication Data
US 2013/0012249 A1 Jan. 10, 2013

Related U.S. Application Data

(60) Provisional application No. 61/495,473, filed on Jun. 10, 2011.

(51) Int. Cl.
*H04B 15/00* (2006.01)
*H04W 72/04* (2009.01)
(Continued)

(52) U.S. Cl.
CPC ........ *H04W 72/0426* (2013.01); *H04W 72/082* (2013.01); *H04W 84/045* (2013.01); *H04W 92/20* (2013.01)

USPC .......... 455/501; 455/502; 455/450; 455/451; 455/452.1; 455/453

(58) Field of Classification Search
USPC ........... 455/502, 450–455, 63.1, 67.11, 67.13
See application file for complete search history.

(56) References Cited

U.S. PATENT DOCUMENTS

2010/0202391 A1  8/2010  Palanki et al.
2010/0246483 A1* 9/2010  Erceg et al. ................... 370/328
(Continued)

FOREIGN PATENT DOCUMENTS

WO   WO 2011/047348 A1   4/2011

OTHER PUBLICATIONS

International Search Report, Application No. PCT/SE2012/050264, Jul. 4, 2012.
(Continued)

*Primary Examiner* — Fayyaz Alam
(74) *Attorney, Agent, or Firm* — Myers Bigel Sibley & Sajovec, P.A.

(57) ABSTRACT

Apparatus and methods are disclosed for mitigating interference to radio base stations. A first base station provides a served cell that at least partially overlaps a served cell of a second base station. The first and second base stations are part of a telecommunications system. The method includes identifying at least one carrier that is preferable for the second base station to utilize for communications with at least one UE to avoid interference. The method further includes communicating an instruction message from the first base station to the second base station that instructs the second base station to use the at least one carrier for communications.

20 Claims, 19 Drawing Sheets

(51) Int. Cl.
*H04W 72/08* (2009.01)
*H04W 84/04* (2009.01)
*H04W 92/20* (2009.01)

(56) References Cited

U.S. PATENT DOCUMENTS

2011/0250858 A1* 10/2011 Jain et al. ............... 455/120
2011/0255486 A1* 10/2011 Luo et al. ............... 370/329
2012/0028584 A1*  2/2012 Zhang et al. ........... 455/63.1
2013/0153298 A1*  6/2013 Pietraski et al. ........ 175/45

OTHER PUBLICATIONS

Written Opinion of the International Searching Authority, Application No. PCT/SE2012/050264, Jul. 4, 2012.

Telefónica, "Autonomous cross carries signalling for HetNet ICIC deployments", Document #R3-111512, 3GPP TSG RAN WG3 Meeting #72, Barcelona, Spain, May 17-21, 2011, 3 pp.

Ericsson, "Initial considerations on Carrier Based HetNet ICIC", Document #R3-111480, 3GPP TSG-RAN3 Meeting #72, Barcelona, Spain, May 9-14, 2011, 4 pp.

* cited by examiner

METHODS AND APPARATUS FOR DYNAMIC CARRIER SELECTION FOR CELL BASE STATIONS

RELATED APPLICATIONS

The present application is a 35 U.S.C. §371 national stage application of PCT International Application No. PCT/SE2012/050264, filed on Mar. 9, 2012, which itself claims the benefit of priority from U.S. Provisional Application No. 61/495,473 entitled "Support of Dynamic Carrier Selection for Cell Base Stations" filed Jun. 10, 2011, the disclosures of both of which are hereby incorporated herein in their entirety by reference.

TECHNICAL FIELD

The technology described herein pertains to telecommunications, and particularly to the selection of radio frequency carriers for base station nodes, including but not limited to small cell base station nodes.

BACKGROUND

In a typical cellular radio system, wireless terminals, also known as mobile stations and/or user equipment nodes (UEs), communicate via a radio access network (RAN) to one or more core networks. The radio access network covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment nodes (UE) within range of the base stations.

In some versions of the radio access network, several base stations are typically connected, e.g., by landlines or microwave, to a controller node, such as a radio network controller (RNC) or a base station controller (BSC), which supervises and coordinates various activities of the plural base stations connected thereto. The radio network controllers are typically connected to one or more core networks.

The Universal Mobile Telecommunications System (UMTS) is a third generation mobile communication system, which evolved from the second generation (2G) Global System for Mobile Communications (GSM). The UMTS terrestrial radio access network (UTRAN) is essentially a radio access network using wideband code division multiple access for user equipment nodes (UEs). In a forum known as the Third Generation Partnership Project (3GPP), telecommunications suppliers propose and agree upon standards for third generation networks and UTRAN specifically, and investigate enhanced data rate and radio capacity.

Specifications for the Evolved Packet System (EPS) have completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to radio network controller (RNC) nodes. In general, in E-UTRAN/LTE the functions of a radio network controller (RNC) node are distributed between the radio base stations nodes, e.g., eNodeBs in LTE, and the core network. As such, the radio access network (RAN) of an EPS system has an essentially "flat" architecture comprising radio base station nodes without reporting to radio network controller (RNC) nodes.

FIG. 3 shows, in simplified manner, example architecture of the 3G Long Term Evolution (LTE) system. In the above as mentioned above, LTE is based on a flat architecture compared to 2G and 3G systems. Each cell is served by an eNodeB or eNB ("base station"), and handovers between cells can be handled either via the Mobility Management Entity (MME) and the S1 interface, or directly between the eNBs via the X2 interface.

The current solutions existing for interference coordination and mitigation have been designed for intra-carrier operation. Namely, these solutions will help reducing interference within a carrier already in use by a number of cells in a given neighbourhood.

The solutions so far standardised rely on signalling over the X2 interface of the following parameters:

A Relative Narrowband Transmit Power (RNTP)—used to give an intra-carrier indication of DL interference;

a High Interference Indicator (HII)—used to give an intra-carrier indication of UL interference sensitive PRBs; and an Overload Indicator (OI)—used to provide an intra-carrier indication of overall UL interference.

In the tenth release of LTE (e.g., rel10) an extra mechanism to reduce interference has been finalized by the use of Almost Blank Subframes (ABS). ABS involves signalling, over the X2 interface, a pattern of intra-carrier subframes where the aggressor will reduce its transmissions to allow the victim to have interference free communication.

What has thus far not being designed or standardised is a mechanism that relies on inter-carrier solutions for interference mitigation. Such mechanism could be of relevance for operators with more than one carrier available and with the possibility/willingness to let certain types of cells to freely use a carrier within a certain carrier range in order to minimise overall interference.

A recent 3GPP contribution (3GPP TSG-RAN WB3 Meeting #72, R3-111419, Barcelona, Spain, May 9-13, 2011, Agenda item 14.1, "A Plan for LTE Rel-11 Carrier Based Interference Management", incorporated herein by reference) outlined the general need of inter-carrier interference mitigation solutions but did not describe any structural or operational details.

What is needed therefore, and thus an object of at least some of the technology disclosed herein, are apparatus, methods, and techniques for carrier based interference coordination/mitigation.

SUMMARY

Various embodiments of technology described herein encompasses apparatus and methods to allow a "macro" base station to select one or more carriers for use by a "small cell" base station that may be positioned partially or entirely within the served cell of the macro base station. Various apparatus and methods disclosed herein may operate to mitigate RF interference experienced by the small cell base station and/or by the macro base station.

As used herein, the term "small cell" refers to Femto cells or Pico cells or, in general, cells with a coverage area that is smaller than and at least partially overlapped by a served cell of a macro eNB cell. The term "carrier" encompasses, in some embodiments, an operational carrier (e.g., one or more defined RF frequencies), while in other embodiments in which the base station supports carrier aggregation, the term "carrier" can encompass a primary component carrier.

One embodiment is directed to a method that is performed by a first base station (e.g., macro eNB) that provides a served cell that at least partially overlaps a served cell of a second base station (e.g., Femto/Pico eNB). The first and second base stations are part of a telecommunications system. The method includes identifying at least one carrier that is preferable for the second base station to utilize for communications with at least one UE to avoid interference. The method further includes communicating an instruction message from the first base station to the second base station that instructs the second base station to use the at least one carrier for communications.

According to some further embodiments, the selection of which carrier(s) is/are to be used by the second base station is based on: 1) an estimation of interference carried out by the first base station (e.g., macro eNB) in the neighborhood of the second base station (e.g., Femto/Pico eNB); 2) an estimation of interference from information received by the first base station (e.g., Macro eNB) via X2 from one or more connected base stations (e.g. ENBs); 3) an estimation of interference from measurements collected by UEs on available neighbour cells; and/or 4) an estimation of interference from information about which carrier the first base station (e.g., Macro eNB) intends to protect and avoid inducing excessive interference to.

Another embodiment is directed to a method by a first base station (e.g., Femto/Pico eNB) that provides a served cell that is at least partially overlapped by a served cell of a second base station (e.g., macro eNB). The first and second base stations are part of a telecommunications system. The method includes receiving an instruction message from the second base station that instructs the first base station to use at least one identified carrier. The method further includes communicating with at least one UE using the at least one identified carrier.

Another embodiment is directed to a first base station (e.g., macro eNB) of a telecommunications system that includes a second base station (e.g., Femto/Pico eNB) and a control element node (e.g., MME/S-GW). The first base station includes a core network interface, an X2 interface, a radio interface, and a carrier suggestion generator. The core network interface communicatively connects the first base station to the control element node. The X2 interface communicatively connects the first base station to the second base station. The radio interface provides a served cell for communications with at least one UE, where the served cell at least partially overlaps a served cell of the second base station. The carrier suggestion generator identifies at least one carrier that is preferable for the second base station to utilize for communications with at least one UE to avoid interference. The carrier suggestion generator communicates an instruction message through the core network interface and/or the X2 interface to the second base station that instructs the second base station to use the at least one carrier for communications.

BRIEF DESCRIPTION OF THE DRAWINGS

The foregoing and other objects, features, and advantages of the technology disclosed herein will be apparent from the following more particular description of various embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
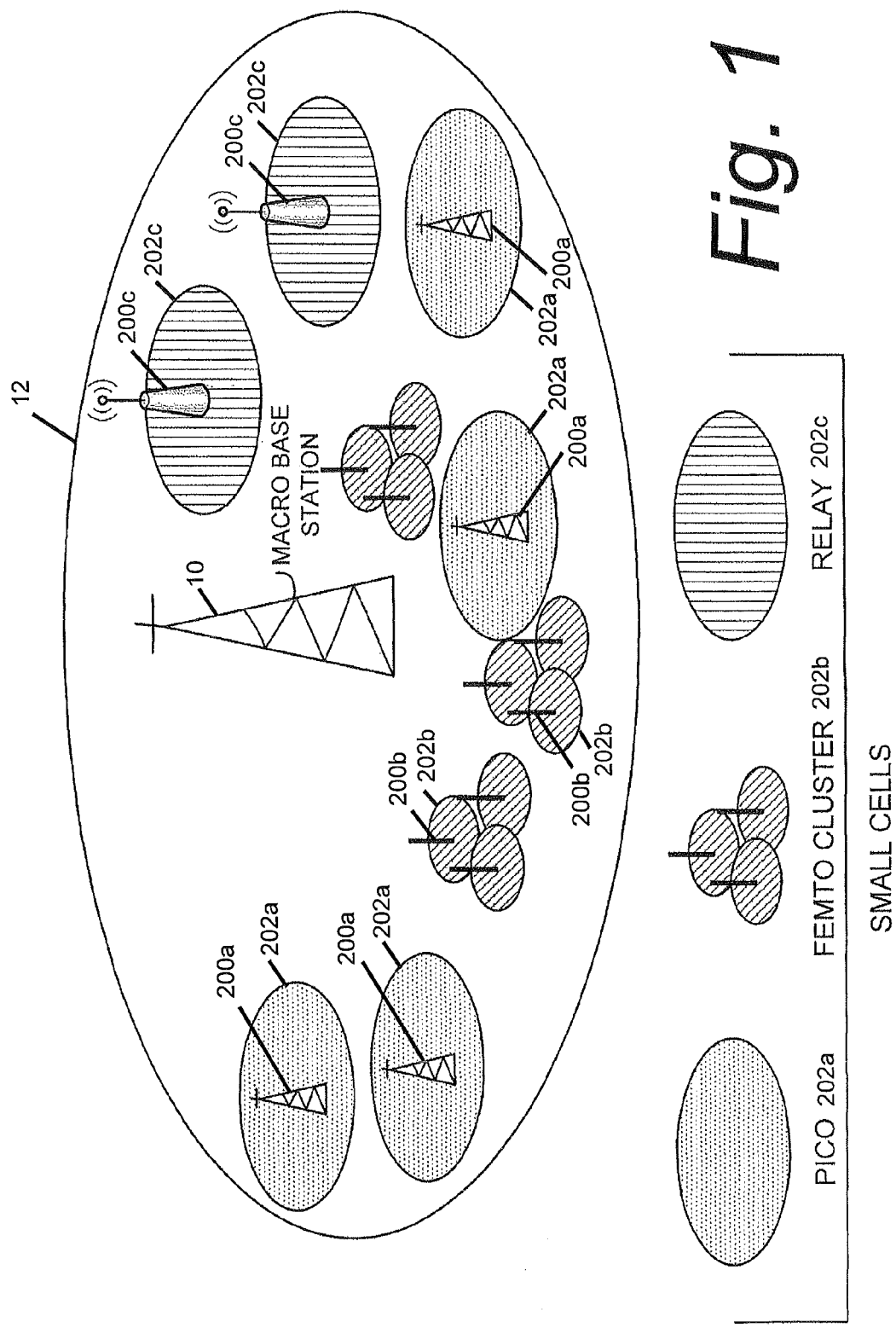
FIG. 1 is a diagrammatic view of portions of a heterogeneous radio access network showing, e.g., example placement of different types of base stations.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

The technology described herein encompasses several embodiments. In a first example embodiment the macro eNBs in the neighbourhood of the base station (e.g., Femto/Pico eNB) for which a carrier is selected are connected to the base station via X2 interfaces. In a second example embodiment there is no X2 interface connection between the base station under analysis, e.g., a base station for which a carrier is selected (e.g, Femto/Pico base station (BS)), and the nearby macro eNBs.

For sake of terminology, "eNB-s" will typically be used herein to describe or refer to the base station for which a carrier needs to be selected for one of its supported cells and/or for which a primary component carrier (PCC) needs to be configured. Further, the cell for which the carrier needs to be selected referred to as "Cell-s". The notation " -s" refers to the fact that the cell is the "selected" cell. In some non-limiting example embodiments and implementations, the cell for which a carrier needs to be selected and/or for which a primary component carrier (PCC) needs to be configured may be a "small" cell (e.g., a Femto/Pico cell). However, it should be amply clear that the base station/cell for which the carrier selection/PCC configuration is made need not be limited to a small base station/cell, but may be any type of base station/cell.

As used herein, the terminology "small base station" is to be understood as broadly encompassing any type of station which operates over a radio or air interface on both downlink (DL) and uplink (UL) and has extent of transmission that is less than (e.g., in geographic range or-power) or subordinate to (e.g., delegated from/by) a macro base station. In corresponding fashion the terminology "small cell" refers to any cellular territory or coverage area served by such broadly defined small base station. In other words, a macro base station has at least one of higher nominal transmit power and larger coverage area than a small base station. Examples of types of cells and base stations encompassed by the terminology "small cell" and "small base station" are illustrated in FIG. 1 as including pico cells 202a and pico base stations 200a, femto cells 202b (which can exist in a femto cluster) and femto base stations 200b, and relay base stations 200c having served cells 202c. Macro base stations 10 are typically separated by distances on the order of kilometers, and thus the radii of macro cells 12 is also on the order of kilometers. On the other hand, small base stations are typically separated by distances on the order of a few hundred meters (e.g., 100 m-200 m, and in some instances 500 m), and thus the radii of small cells is also on the order of a few hundred meters. A small cell may also be referred to as a "micro" cell, and a small base station may also be referred to as a "micro" base station.

According to one of the aspects of the technology disclosed herein, a macro eNB(s) 10 covering the extension of Cell-s provides a "suggestion" to eNB-s (e.g., 200a, 200b, 200c) regarding the best carrier to select. The suggestion can include one or more carriers. In one example embodiment, such suggestion is provided via a new information element sent over an X2 interface between the macro eNB(s) and eNB-s. In a different example embodiment such suggestion is provided over the interface between eNB-s and an Operation and Maintenance (OAM) system.

Figure 2:
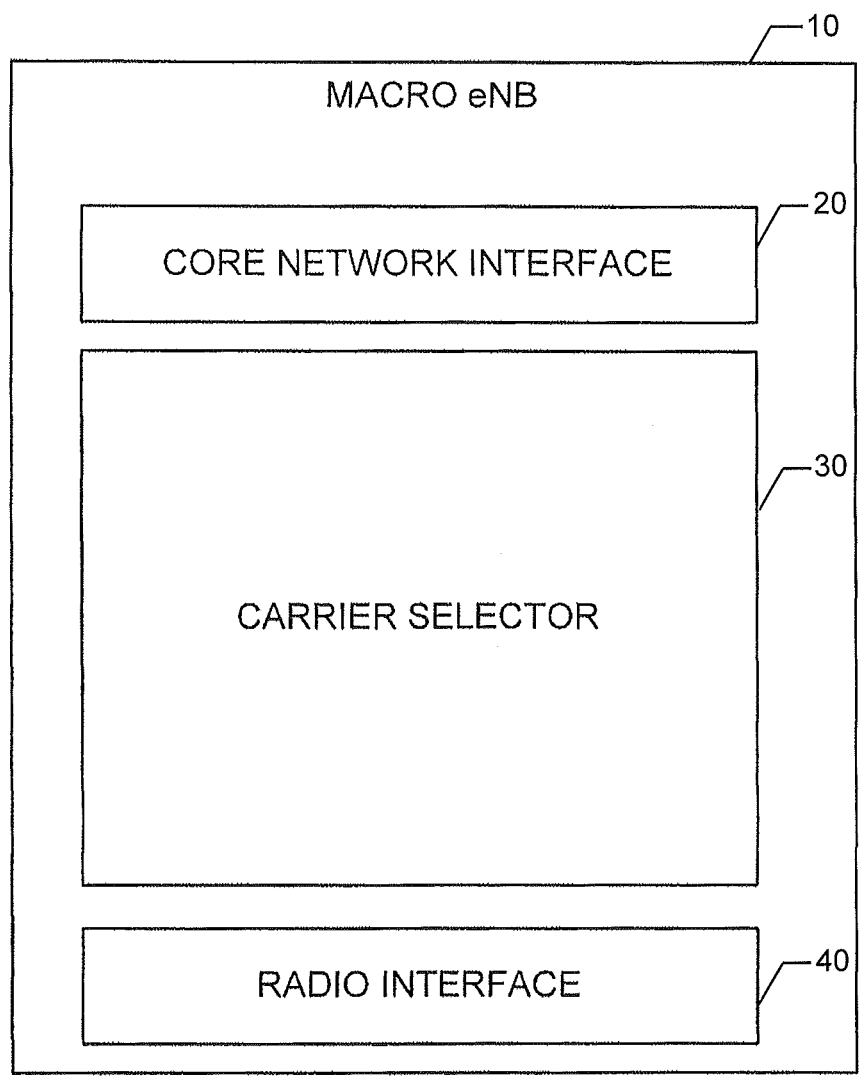
FIG. 2 is a schematic view of an example embodiment of a macro base station.

FIG. 2 shows an example macro eNB 10. The macro eNB 10 comprises, among other possible functionalities and units, a radio interface 40 for communicating with wireless units served by the macro eNB 10, a core network interface 20, and a carrier selector 30 which is configured to select, or at least make a suggestion, regarding a carrier to be used by the eNB-s.

For simplicity it is initially assumed that there is only one macro cell covering the extension of Cell-s. By "extension of Cell-s" is meant the area covered by Cell-s, e.g., the Cell-s coverage area. In general, such macro cell covering the extension of Cell-s will herein be referred to as "Cell-M" and its serving eNB will be referred to as "eNB-M".

Figure 3:
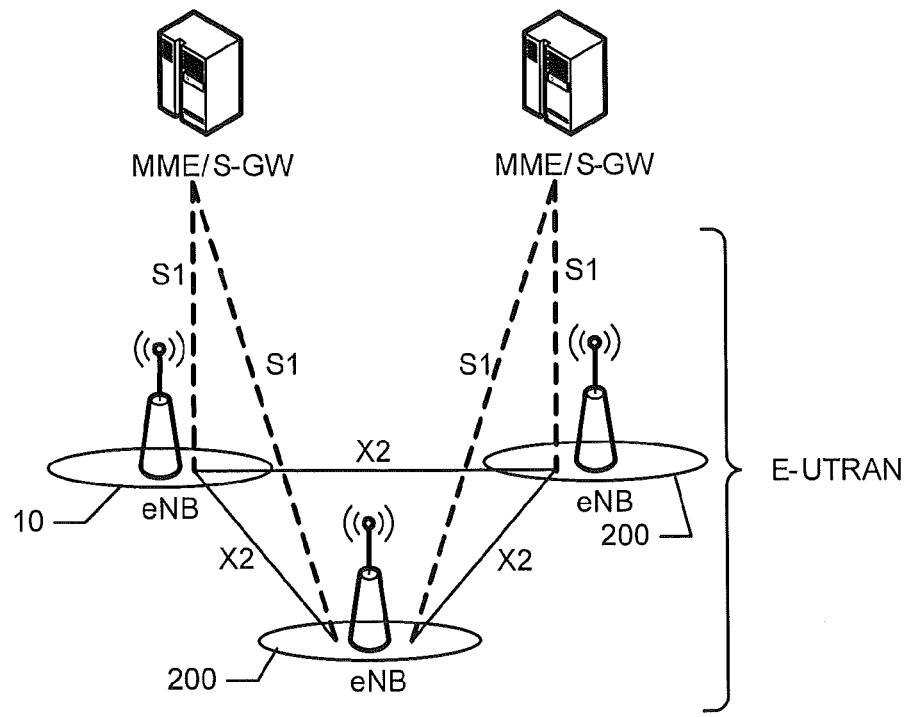
FIG. 3 is a diagrammatic view of example LTE architecture showing, e.g., logical interfaces (X2 interfaces) between base station nodes and logical interfaces (S1 interfaces) between base station nodes and Mobility Management Entity (MME)/Serving gateways (S-GW).
Figure 4:
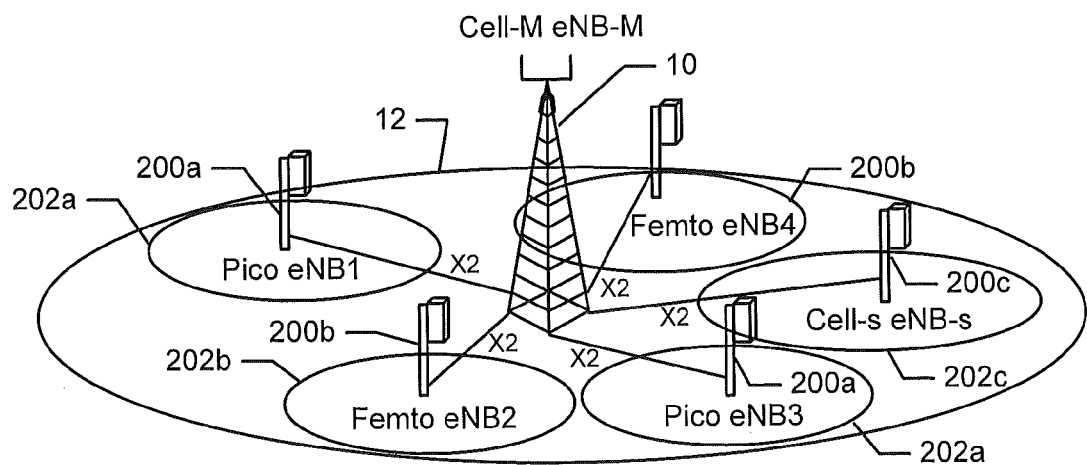
FIG. 4 is a diagrammatic view illustrating an example scenario involving carrier assignment to a cell Cell-s.

In one example embodiment, mode, and scenario illustrated in FIG. 3 and FIG. 4, all the eNBs 200 involved in the process of evaluating the best carrier to assign to Cell-s are connected to eNB-M 10 via an X2 interface. In yet another example embodiment, mode, and scenario, there is no X2 connection between eNB-s 200 and eNB-M 10. Both example embodiments are encompassed by the technology disclosed herein, although at certain junctures the discussion herein may concentrate on only one of the example embodiments.

Section 1: Macro eNB Connected to Small eNB over X2 Interface

Figure 5:
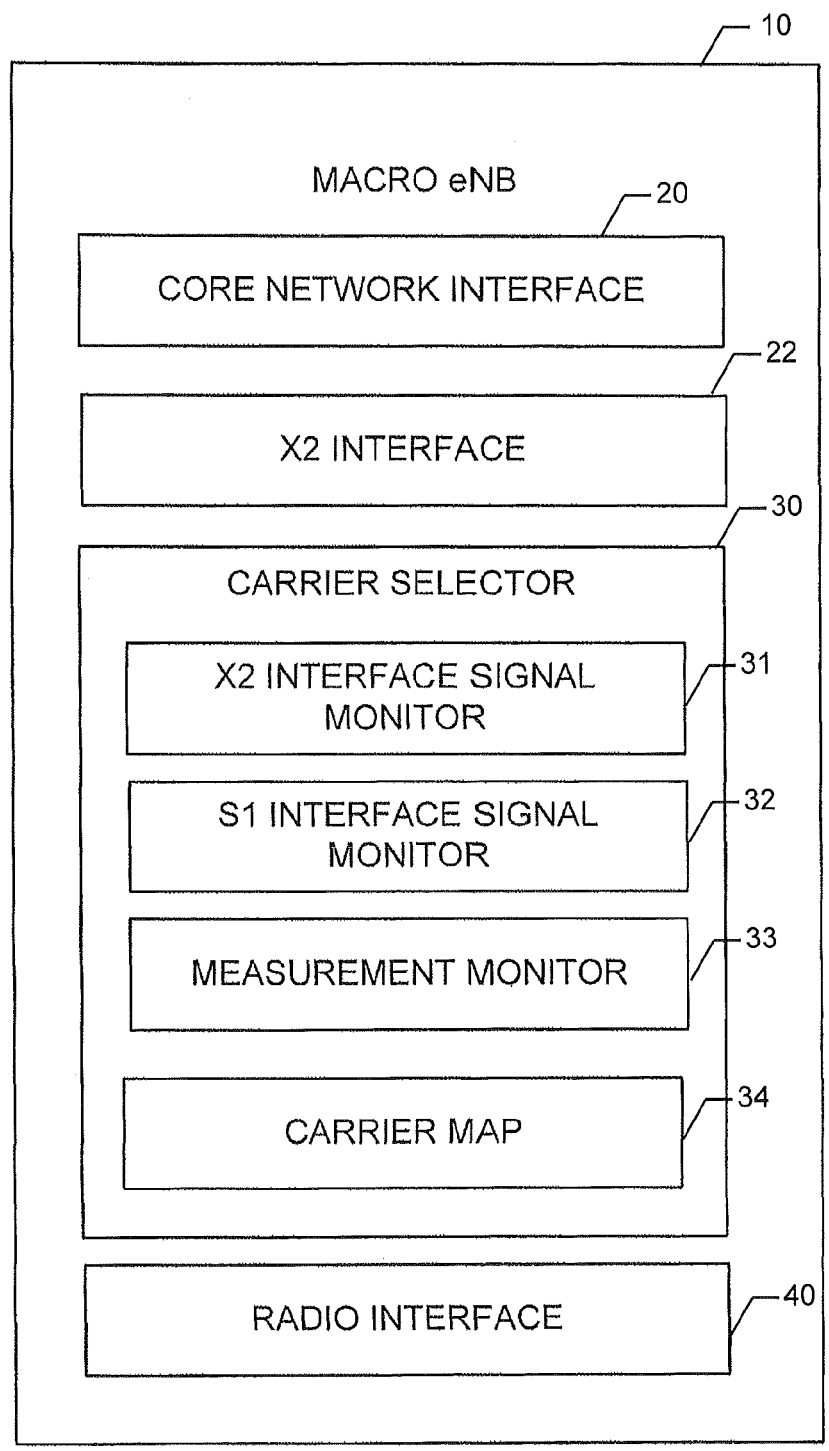
FIG. 5 is a schematic view of a macro base station according to an example embodiment which is connected to another base station via an X2 interface.

FIG. 5 is a schematic view of a macro eNB 10 (e.g., eNB-M) according to an example embodiment wherein the macro eNB 10 is connected to another eNB via an X2 interface 22. The macro eNB 10 of FIG. 5 comprises a radio interface 40, a core network interface 20, a X2 interface 22, and a carrier selector 30 configured to select, or at least make a suggestion regarding carrier selection, for eNB-s. In an example implementation shown in FIG. 5, carrier selector 30 comprises an X2 interface signal monitor 31; a measurement monitor 33, a S1 interface signal monitor 32; and a carrier map 34 (which maintains, e.g., a list of carriers that are being used and/or are reserved for use by the macro eNB 10 and/or more one or more neighboring base stations).

FIG. 3 shows an example embodiment in which plural eNBs 10,200 are connected to one another via X2 interfaces, with the plural eNBs also being connected by S1 interfaces to one or more Mobility Management Entities (MME)/Serving Gateways (S-GW). FIG. 4 illustrates carrier assignment for Cell-s in the FIG. 3 example embodiment. In conjunction with the example embodiment of FIG. 3 and FIG. 4, at setup of an X2 interface between an eNB-M 10 and all its neighbour cells 202a-c, the eNB-M 10 is informed of the carrier frequency used by each of its neighbour cells 202a-c. The eNB-M 10 may be informed of the carrier frequency used by each of its neighbour cells 202a-c by information present in a Served Cells Information Element (IE) in the X2 SETUP REQUEST message during setup of the respective X2 interfaces. The eNB-M 10 can also know the carrier frequency(ies) of each neighbour cell, which may be learned through information that is present in a Neighbour Information Element (IE) in the X2 SETUP REQUEST and X2 SETUP RESPONSE message.

The eNB-M 10 is configured to use this information regarding carriers utilized by neighbour cells to generate and maintain a map (e.g., a logical association of information in memory) of the carriers that are being used and/or are reserved for use by the served cell and/or neighboring cells. For operational cell carrier assignment, when the eNB-M 10 has been configured with a number of carriers that could be assigned to Cell-s 200, the eNB-M 10 can be configured to assign a carrier for use by the Cell-s 200 that is not yet in use by the served cell and/or neighboring cells and/or is not yet reserved for use by the served cell and/or neighboring cells.

For PCC configuration, the eNB-M 10 can be configured to assign the PCC for use by the Cell-s 200 similarly based on operational cell carriers that are not yet used and/or not yet reserved for use by neighboring cells. Additionally, if already configured PCCs in neighbour cells were signalled over X2, the eNB-M 10 could base its assignment of one or more carriers for use by Cell-s 200 on this information.

Figure 6:
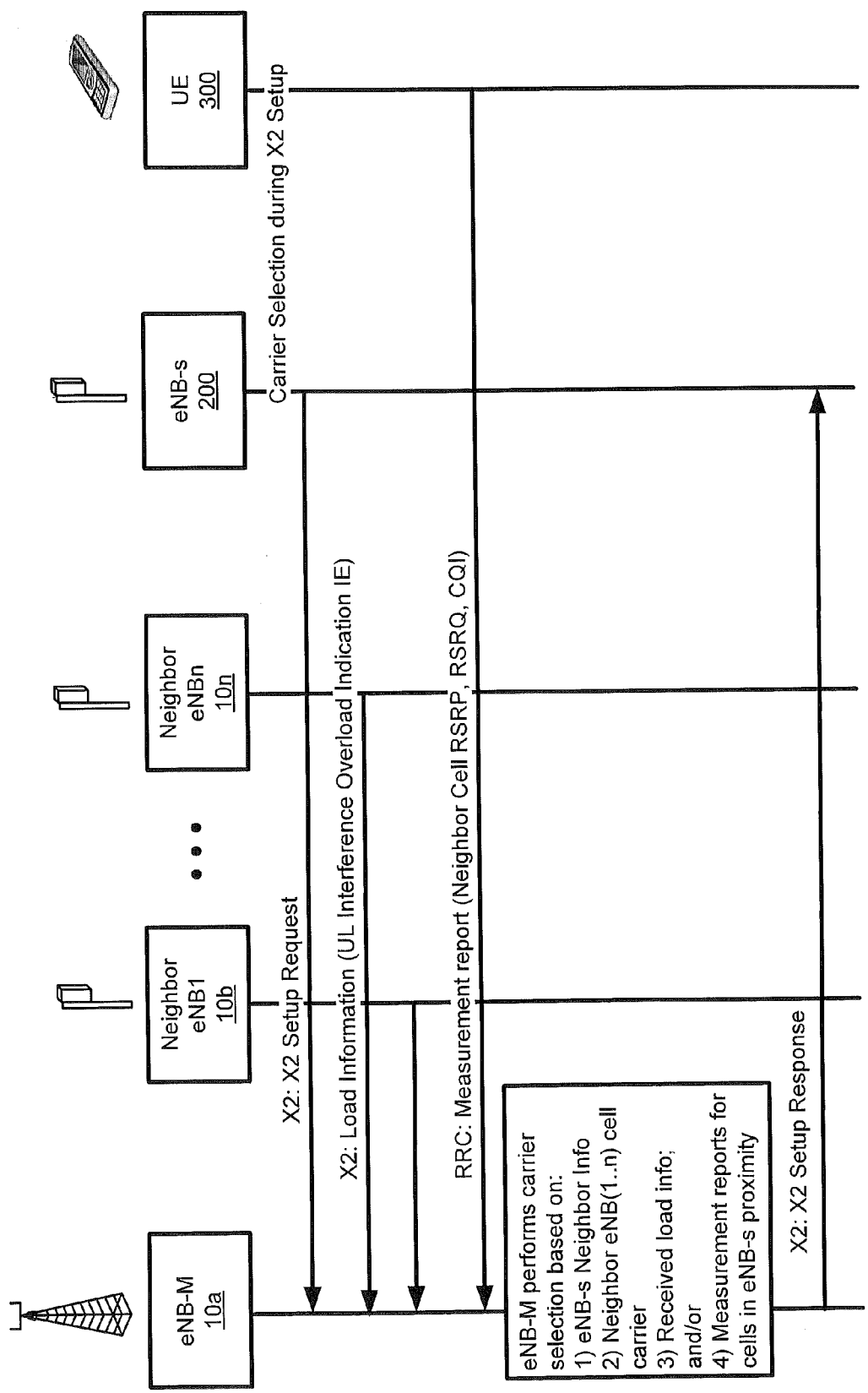
FIG. 6 is a diagrammatic view showing example acts comprising carrier selection for a cell during an X2 SETUP procedure.

Therefore in one of its example aspects, and as illustrated, e.g., in FIG. 6, the technology disclosed herein adds a PCC indicator in the Served Cells IE and Neighbour Information IE in the X2 SETUP REQUEST/RESPONSE and X2: eNB CONFIGURATION UPDATE messages in order to let X2-connected neighbour eNBs know which PCC has already been configured in each neighbour cell.

Therefore in another of its example aspects and an example implementation, the technology disclosed herein also adds an indicator in the X2 SETUP REQUEST/RESPONSE, which indicates whether the node sending it is seeking for a "suggestion" on which carrier to select. The X2 SETUP REQUEST/RESPONSE can include a carrier selection IE which can include, but is not limited to, indicating a choice of an operational cell carrier and/or PCC, a Cell-s E-UTRAN Cell Global Identifier (ECGI), and/or neighbor cell IE (e.g., a PCC assigned to a neighboring cell).

Figure 7:
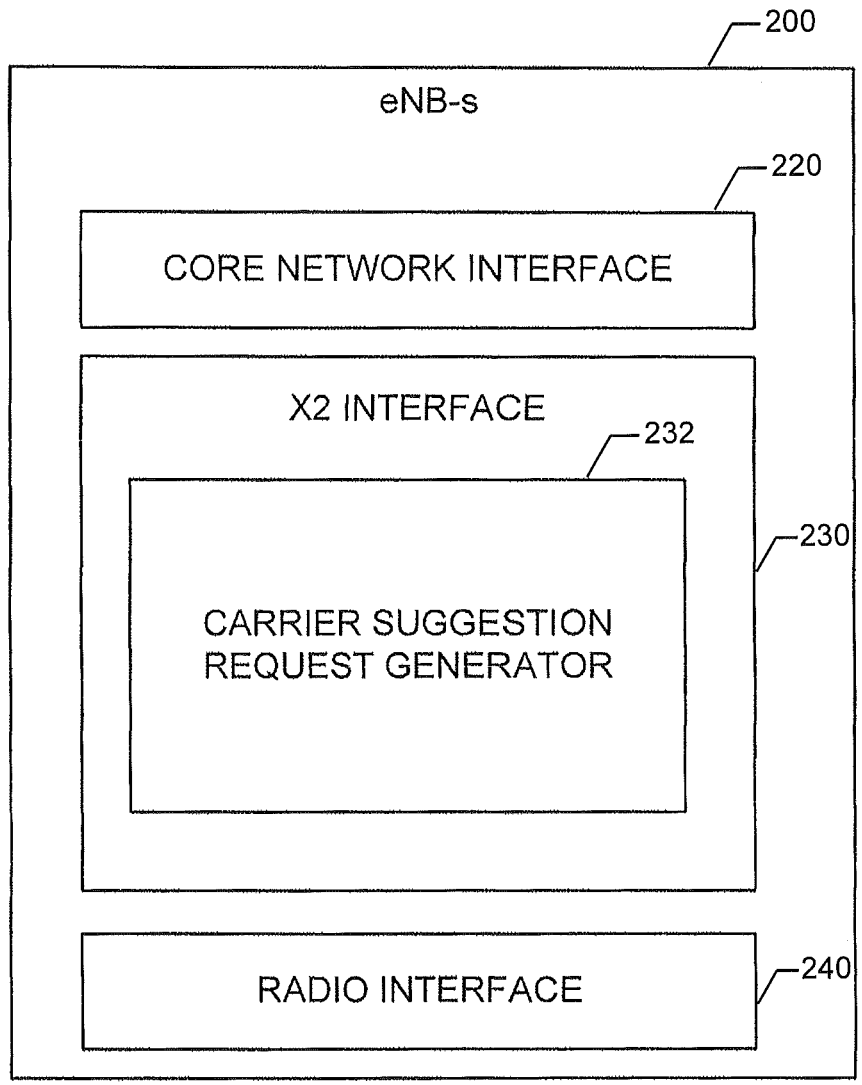
FIG. 7 is a schematic view of a small base station according to an example embodiment which comprises a carrier suggestion request generator.

FIG. 7 is a schematic view of a small eNB (e.g., eNB-s) 200 according to an example embodiment which comprises an X2 interface unit 230 that includes a carrier suggestion request generator 232.

The eNB-M 10 can receive carrier/interference information on the level of uplink interference monitored in each neighbour cell. This can be achieved by receiving the UL Interference Overload Indication IE in the X2: LOAD INFORMATION message (according to 3GPP TS 36.423v10.1.0, Release 10). As part of the technology disclosed herein reception of such message from neighbour eNBs could be either periodic or triggered by sending the same message to the neighbour eNB.

The eNB-M 10 may also receive measurement reports from connected UEs 300 providing information on downlink interference levels on neighbour cells. Such measurements need to be configured by eNB-M 10 and can be collected on a specific cell when such cell is visible to the UE 300.

Once the X2 SETUP procedure is completed between eNB-M 10 and eNB-s 200 (relative to registration of Cell-s with eNB-M), the eNB-M 10 is also aware of the neighbourhood in which eNB-s is located. This is due, at least in part, to the Neighbour Information IE reported by eNB-s 200.

Therefore, the eNB-M 10 may perform a first evaluation of what is the most appropriate operational carrier or of what is the most appropriate PCC to assign to Cell-s 200 on the basis of one or more of the following information:

1) Neighbourhood surrounding eNB-s 200 obtained by Neighbour Information IE added in S1 SETUP procedure with eNB-s 200. The Neighbour Information IE may include PCCs already in use. For example, the current S1 SETUP procedure could be modified to include Neighbour Information. The Neighbour Information could be modified to include PCCs in use. With this information eNB-s 200 can evaluate which cell carriers and PCCs are in use in the neighbourhood. If a cell carrier or PCC is "free" that would be the most logical choice for the cell carrier/PCC for Cell-s 202;

2) Neighbourhood surrounding eNB-s 200, obtained by Neighbour Information IE in X2 SETUP REQUEST/RESPONSE procedure with eNB-s 200. The Neighbour Information IE may include PCCs already in use. If the Neighbour Information IE and list of PCCs in use in the neighbourhood is not provided via S1 SETUP, it could be provided via X2 SETUP. Note that the Neighbour Information is already included in the X2 SETUP REQUEST/RESPONSE messages, therefore the addition to these messages can be the PCCs in use by each neighbour in the neighbourhood. The way the information is used would be the same as per the S1 SETUP case;

3) Overload Indication IE received by neighbour eNBs and relative to neighbour cells. Assuming that a carrier or PCC that is already being in use within the neighbourhood needs to be selected, eNB-s 200 will have to evaluate which carrier/PCC is the right choice to minimise interference. For such evaluation the Overload Indication IE (received by neighbour eNBs over X2) is used. This IE gives information on UL interference experienced by each neighbour cell for each PRB. A carrier/PCC on a frequency in which UL interference is at minimum levels in the neighbourhood could be the right choice; and/or 4) Measurements previously collected by UEs 300 reporting RSRP, RSRQ and QCI of neighbour cells. Similarly to the above bullet, when a carrier already in use in the neighbourhood needs to be chosen (or purely for reasons of carrier/PCC selection validation), eNB-s 200 could use UE measurement reports on neighbour cells in order to evaluate the DL interference UEs 300 are subject to when measuring neighbour cells. The carrier/PCC selection should be for a carrier where DL interference in the neighbourhood is at minimum levels.

In some example embodiments and modes the eNB-M 10 may need to further check the level of downlink interference for the most promising carrier in the eNB-s neighbourhood. Provided that such carrier is used by some other cell in eNB-s neighbourhood, the eNB-M can configure neighbour cell measurements for UEs detecting Primary Cell Identities (PCIs) corresponding to cells using such carrier within the selected neighbourhood.

Once the carrier for Cell-s is selected by eNB-M, the selection can be communicated to eNB-s in a number of ways, depending on whether:

a) The eNB-M 10 and the eNB-s 200 are connected via X2;
b) Carrier assignment needs to be carried out at X2 SETUP; and/or
c) Carrier assignment needs to be carried out after X2 SETUP.

Depending on the scenarios above, in an example embodiment and mode a new IE may be included in the X2 SETUP RESPONSE and in the X2: eNB CONFIGURATION UPDATE message that can be sent from eNB-M 10 to eNB-S 200. In the case of no X2 connection between eNB-M 10 and eNB-S 200 a new IE may be sent from and Operational and Maintenance node (OAM) 400 (FIG. 10) to eNB-s 200. Such new IE may need to indicate the selected carrier and the Enhanced Cell Global Identity or E-UTRAN Cell Global Identifier (ECGI) of the cell for which such carrier has been selected.

When the carrier assignment needs to be carried out at the moment of X2 setup between eNB-s and eNB-M, then a Carrier Request Indicator IE and the ECGI of the cell in need of carrier assignment can be added in the X2 SETUP REQUEST message from eNB-s to eNB-M and a Selected Carrier IE plus ECGI of the cell for which such assignment is made can be added in the X2 SETUP RESPONSE from eNB-M 10 to eNB-S 200. It has to be noted that X2 interfaces between eNB-s 200 and surrounding macro eNBs (such as eNB-M 10) are usually configured and setup at eNB-s power up. Therefore, if the carrier assignment mechanism occurs at X2 setup, the carrier will be assigned right after eNB-s 200 powers up, i.e. the assigned carrier will be the first carrier used by eNB-s 200. Further embodiments of the technology disclosed herein concern the case of carrier assignment at eNB-s power up.

Figure 17:
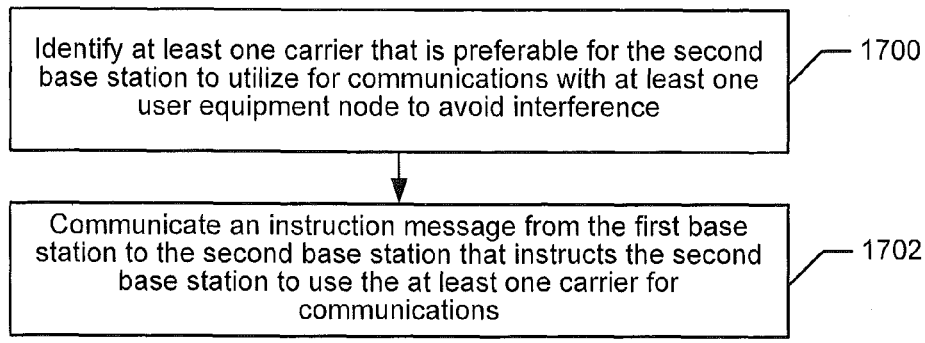
FIGS. 17-25 are flowcharts of operations and methods that can be performed by a base station node, such as a macro base station, according to some embodiments.
Figure 18:
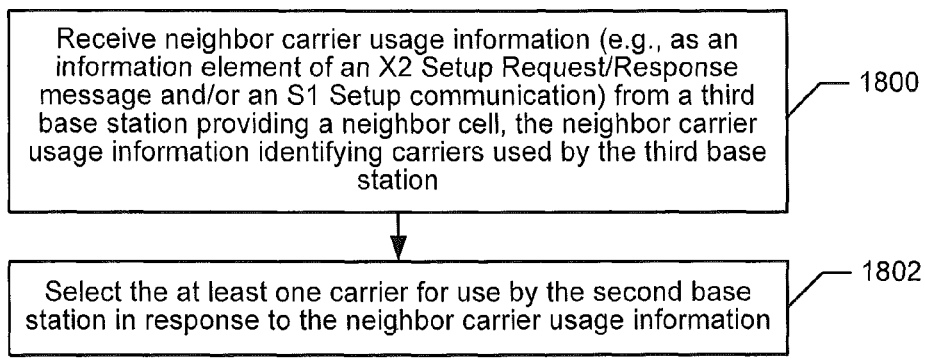

These and other aspects are now explained in a broader sense with regard to FIGS. 17-25, which are flowcharts of operations and methods that can be performed by a base station node, such as a macro eNB 10, according to some embodiments. Referring to FIG. 17, operations and methods are illustrated that can be performed by a first base station (e.g., eNB-M 10) that provides a served cell that at least partially overlaps a served cell of a second base station (e.g., eNB-s 200). The first and second base stations (e.g., eNB-M 10, eNB-s 200) are part of a telecommunications system. The operations and methods include identifying (block 1700) at least one carrier that is preferable for the second base station to utilize for communications with at least one UE to avoid interference. An instruction message is then communicated (block 1702) from the first base station to the second base station that instructs the second base station to use the at least one carrier for communications. The first base station may be operated to provide the served cell with a coverage area that is larger than the served cell of the second base station and that complete overlaps the served cell of the second base station.

According to some embodiments, the first base station can receive neighbor carrier usage information from a base station of a neighbor cell. For example, referring to FIG. 18, identification (block 1700, FIG. 17) of the at least one carrier can include receiving (block 1800) neighbor carrier usage information from a third base station providing a neighbor cell.

The neighbor carrier usage information identifies carriers used by the third base station. The method can further include selecting (block 1802) the at least one carrier for use by the second base station in response to the neighbor carrier usage information.

Figure 19:
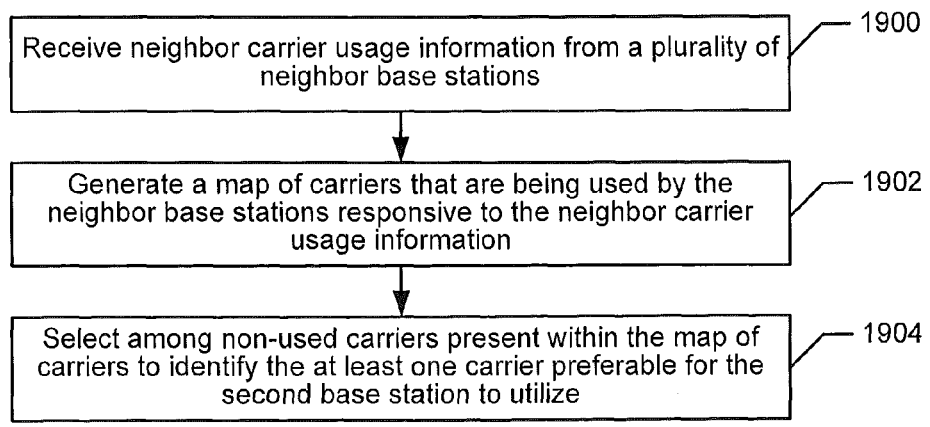
Figure 20:
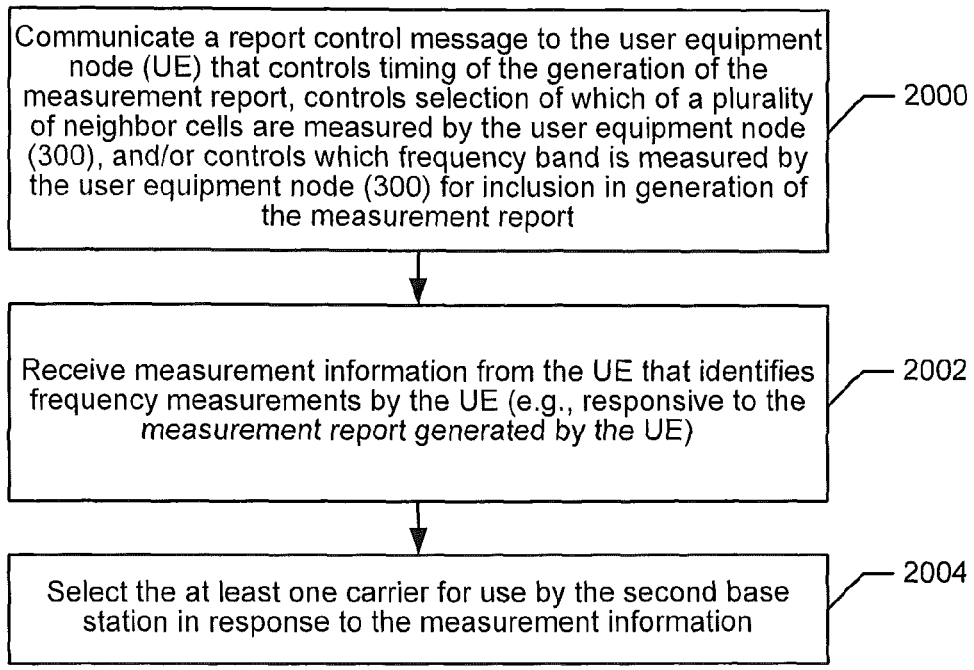
Figure 21:
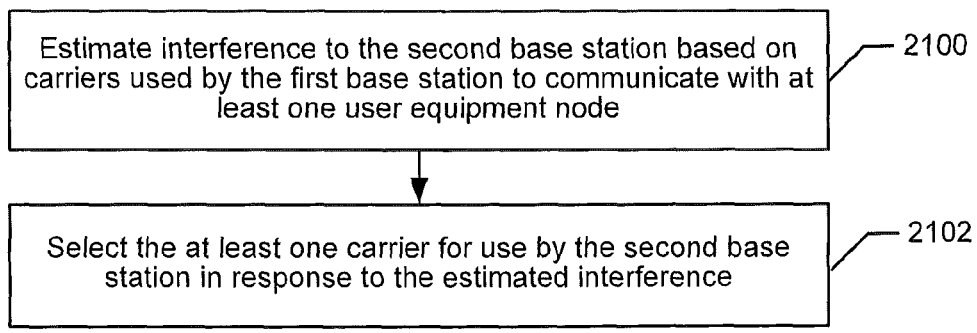
Figure 22:
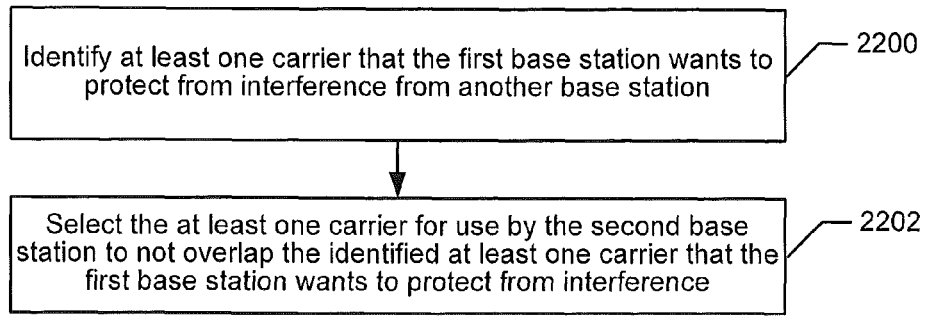
Figure 23:
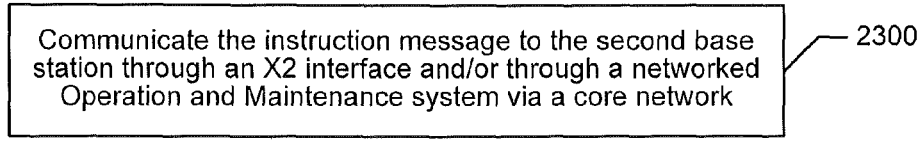
Figure 24:
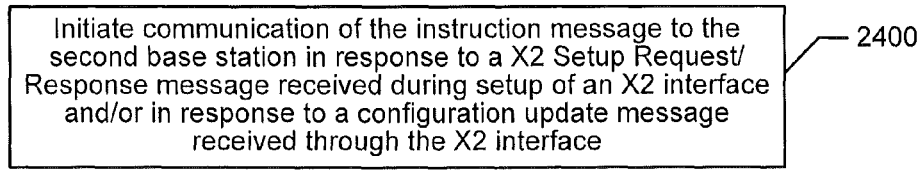
Figure 25:
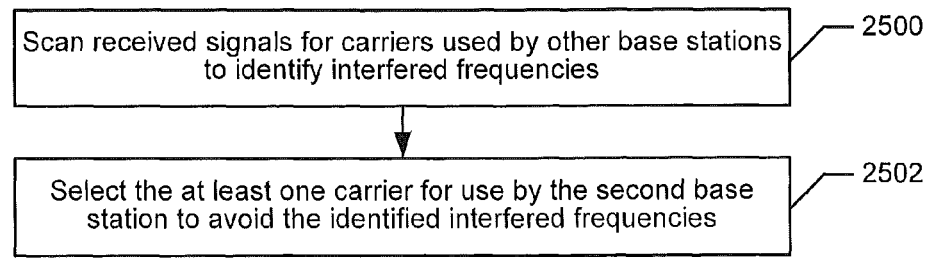

Referring to FIG. 19, the operation and method of receiving (block 1800, FIG. 18) neighbor carrier usage information from the third base station can include receiving (block 1900) the neighbor carrier usage information from a plurality of neighbor base stations. A map can be generated (block 1902) of carriers that are being used by the neighbor base stations responsive to the neighbor carrier usage information. The first base station can then select among the non-used carriers that are present within the map of carriers to identify the at least one carrier that is preferable for the second base station to utilize for communications with the at least one UE to avoid interference. The map may be a listing of the carriers in a memory device or may be any other defined logical association of the carriers.

In another embodiment, the first base station can controls the generation of the measurement reports by a UE. For example, referring to FIG. 20, the operation and method of identifying (block 1700, FIG. 17) the at least one carrier can include communicating (block 2000) a report control message to the UE that controls timing of the generation of the measurement reports, controls selection of which of a plurality of neighbor cells are measured by the UE, and/or controls which frequency band is measured by the UE for inclusion in generation of the measurement report. The first base station can receive (block 2002) measurement information from the UE that identifies frequency measurements by the UE. The at least one carrier can be selected (block 2004) for use by the second base station in response to the measurement information.

The measurement information received from the UE may be generated based on a measurement by the UE of a Reference Signal Received as Power (RSRP), a Reference Signal Received Quality (RSRQ), and/or a Channel Quality Indication (CQI), such as shown in FIG. 6.

In another embodiment, the first base station can estimate interference based on what carriers it uses for the served cell. For example, referring to FIG. 21, the operation and method of identifying (block 1700, FIG. 17) the at least one carrier can include estimating (block 2100) interference to the second base station based on carriers used by the first base station to communicate with at least one UE, and selecting (block 2102) the at least one carrier for use by the second base station in response to the estimated interference.

In another embodiment, the first base station can control the second base station to avoid interference to serve frequencies that the first base station wants to protect. For example, referring to FIG. 22, the operation and method of identifying (block 1700, FIG. 17) the at least one carrier can include identifying (block 2200) at least one carrier that the first base station wants to protect from interference from another base station, and selecting (block 2202) the at least one carrier for use by the second base station to not overlap the identified at least one carrier that the first base station wants to protect from interference.

In another embodiment, the first base station can send an instruction message containing the selected carrier to the second base station through an X2 interface. For example, referring to FIG. 23, the operation and method of communicating (block 1702, FIG. 17) the instruction message to the second base station can include communicating (block 2300) the instruction message to the second base station through an X2 interface that communicatively connects the first and second base stations. Alternatively or additionally, the instruction message can be communicated to the second base station via an OAM system 400 (FIG. 10) through a core network for forwarding of a corresponding instruction message to the second base station.

In another embodiment, the second base station can request an instruction message for the at least one carrier during setup of the X2 interface with the first base station and/or as part of a configuration update message for the X2 interface. For example, referring to FIG. 24, the operation and method of communicating (block 1702, FIG. 17) the instruction message to the second base station can include initiating communication (block 2400) of the instruction message to the second base station in response to a X2 Setup Request/Response message received during setup of an X2 interface and/or in response to a configuration update message received through the X2 interface.

In another embodiment, the first base station can be configured to scan for carriers from other base stations that can interfere with communications by the second base station. For example, referring to FIG. 25, the operation and method of identifying (block 1700, FIG. 17) the at least one carrier can include scanning (block 2500) received signals for carriers used by other base stations to identify interfered frequencies. The first base station can then select (block 2502) the at least one carrier for use by the second base station to avoid the identified interfered frequencies.

Figure 26:
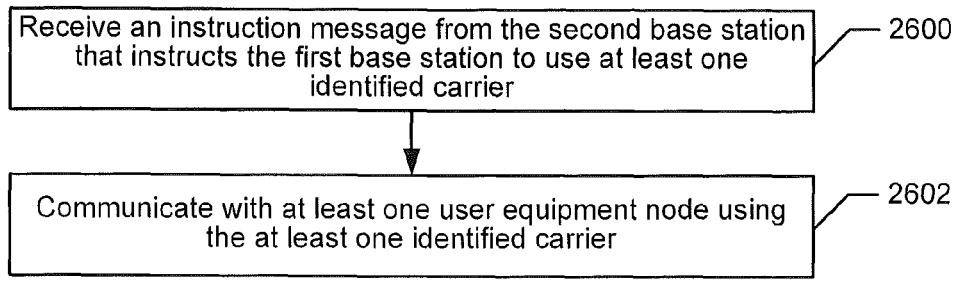
FIGS. 26-28 are flowcharts of operations and methods that can be performed by a base station node, such as small base station, according to some embodiments.
Figure 27:
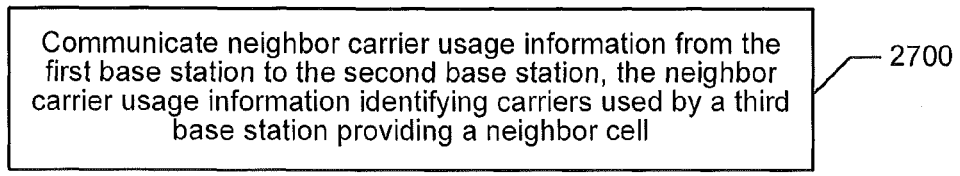
Figure 28:
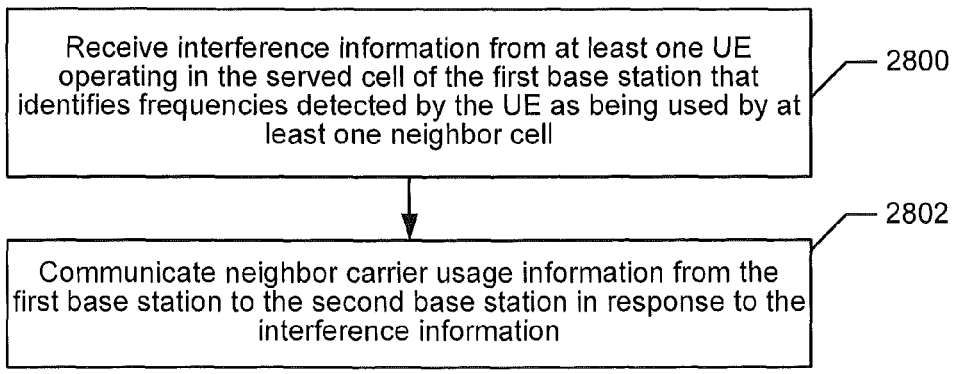

FIGS. 26-28 are flowcharts of corresponding operations and methods that can be performed by a base station node, such as an eNB-s, according to some embodiments. Referring to FIG. 26, operations and methods are illustrated that can be performed by a first base station (e.g., eNB-s 200) that provides a served cell that is at least partially overlapped by a served cell of a second base station (e.g., eNB-M 10). The first and second base stations are part of a telecommunications system. The operations and methods include receiving (block 2600) an instruction message from the second base station that instructs the first base station to use at least one identified carrier. The second base station then communicates (block 2602) with at least one UE using the at least one identified carrier.

In another embodiment, the first base station (e.g., eNB-s 200) can provide neighbor carrier usage to the second base station (e.g., eNB-M 10) for use by the second base station (e.g., eNB-M 10) in selection of the one or more carriers. For example, referring to FIG. 27, the first base station communicates (block 2700) neighbor carrier usage information from the first base station to the second base station, where the neighbor carrier usage information identifies carriers used by a third base station providing a neighbor cell. The second base station uses the neighbor carrier usage information to select the at least one identified carrier, which is then communicated to the first base station through the instruction message.

In another embodiment, the first base station (e.g., eNB-s 200) provides interference information received from a UE to the second base station (e.g., eNB-M 10) for use by the second base station (e.g., eNB-M 10) in selection of the one or more carriers. For example, referring to FIG. 28, the first base station receives (block 2800) interference information from at least one UE operating in the served cell of the first base station that identifies frequencies detected by the at least one UE as being used by at least one neighbor cell. The first base station communicates (block 2802) neighbor carrier usage information from the first base station to the second base station in response to the interference information. The second base station uses the neighbor carrier usage information to select the at least one identified carrier, which is then communicated to the first base station through the instruction message.

Figure 8:
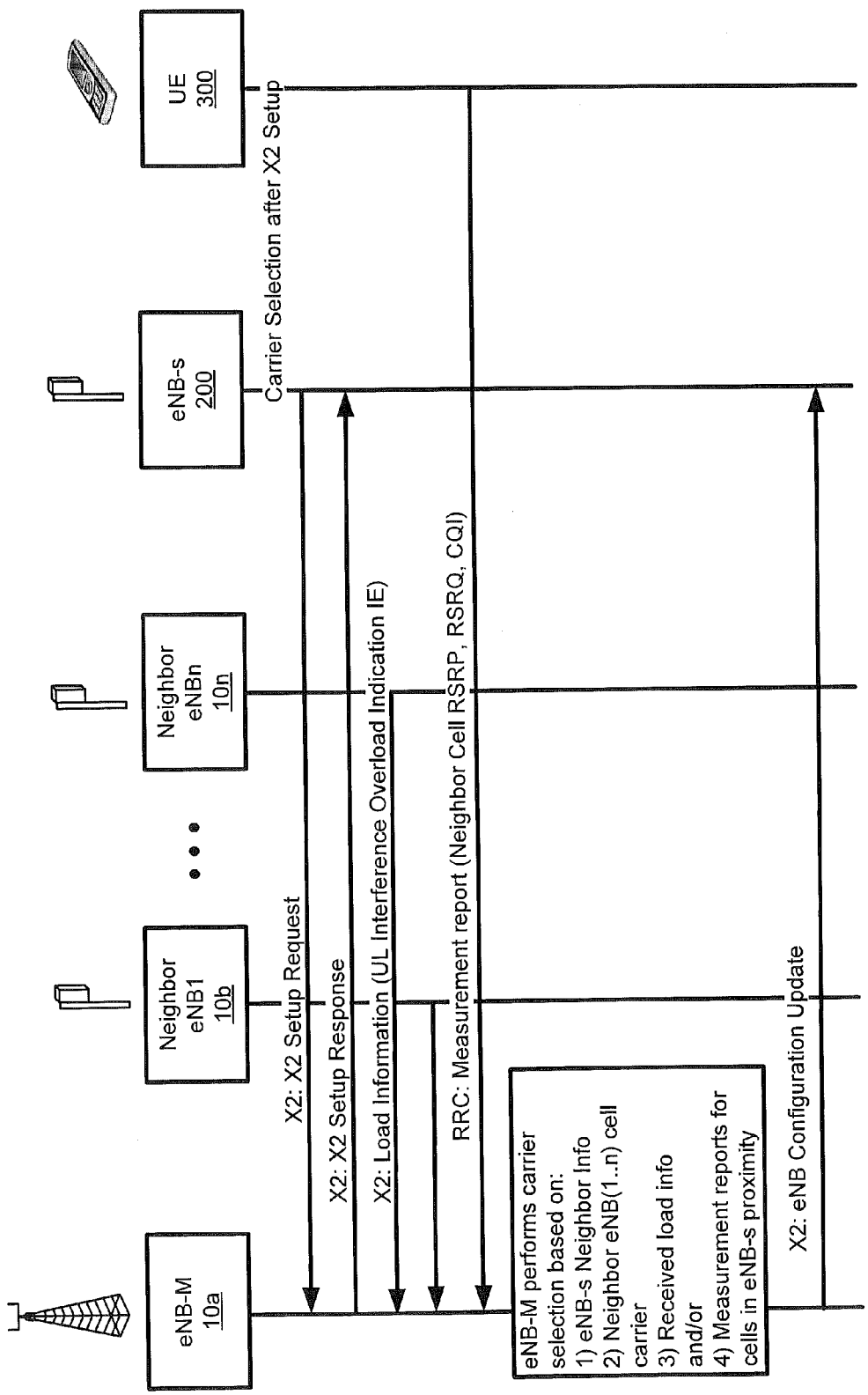
FIG. 8 is a diagrammatic view showing example acts comprising carrier selection for a cell after an X2 SETUP procedure.

FIG. 6 and FIG. 8 show message sequence charts for some of the operations and methods described above. FIG. 6 particularly describes carrier selection for Cell-s during X2 SETUP procedure; FIG. 8 particularly describes carrier selection for Cell-s after XS SETUP procedure.

Referring to FIGS. 6 and 8, the eNB-s 200 communicates an X2 Setup Request message, which contains various Information Elements (IE) explained below, to the eNB-M 10a to setup the X2 communication interface therebetween. The eNB-s 200 also communicates load information, such as uplink (UL) interference overload indication IE, to the eNB-M 10a. The UE 300 communicates Radio Resource Control (RRC) messages to the eNB-M 10a, which can include a measurement report generated by the UE 300. The measurement report can indicate UE measurements of Reference Signal Received Power (RSRP), Reference Signal Received Quality (RSRQ), and/or Channel Quality Indication (CQI).

The technology disclosed herein encompasses inclusion of additional information in the messages. For example, for the FIG. 6 embodiment the additional information includes the Carrier Selection Indicator IE which can include, but is not limited to, indicating a choice of operation cell carrier and/or PCC, a Cell-s E-UTRAN Cell Global Identifier (ECGI), and/or a neighbour cell IE (e.g., a PCC assigned to neighbour cell IE), none of which are specified in the current 3GPP standard. The additional information for the FIG. 8 embodiment includes the same additional information as the FIG. 6 embodiment, and further includes (in the X2: eNB CONFIGURATION UPDATE message) a Selected Carrier IE (which specifies, e.g., an operation cell carrier and/or PCC) and a Cell-s ECGI IE.

The eNB-M 10a performs a selection of one or more carriers for use by the eNB-s 200 based on the eNB-s 200 neighbor information, the neighbour cell carrier usage information, received load information, and/or the measurement report(s) for cells in the eNB-s proximity. The eNB-M 10a communicates the selected one or more carriers through an X2 Setup Response message to the eNB-s 200.

Section 2: Macro eNB not Connected Via X2 to Small eNB

As mentioned above, in another example embodiment, mode, and scenario, there is no X2 connection between eNB-s 200 and eNB-M 10. In this example embodiment the eNB-M 10 collects the same information described in Section 1 in order to be able to perform carrier selection for Cell-s 202.

Figure 9:
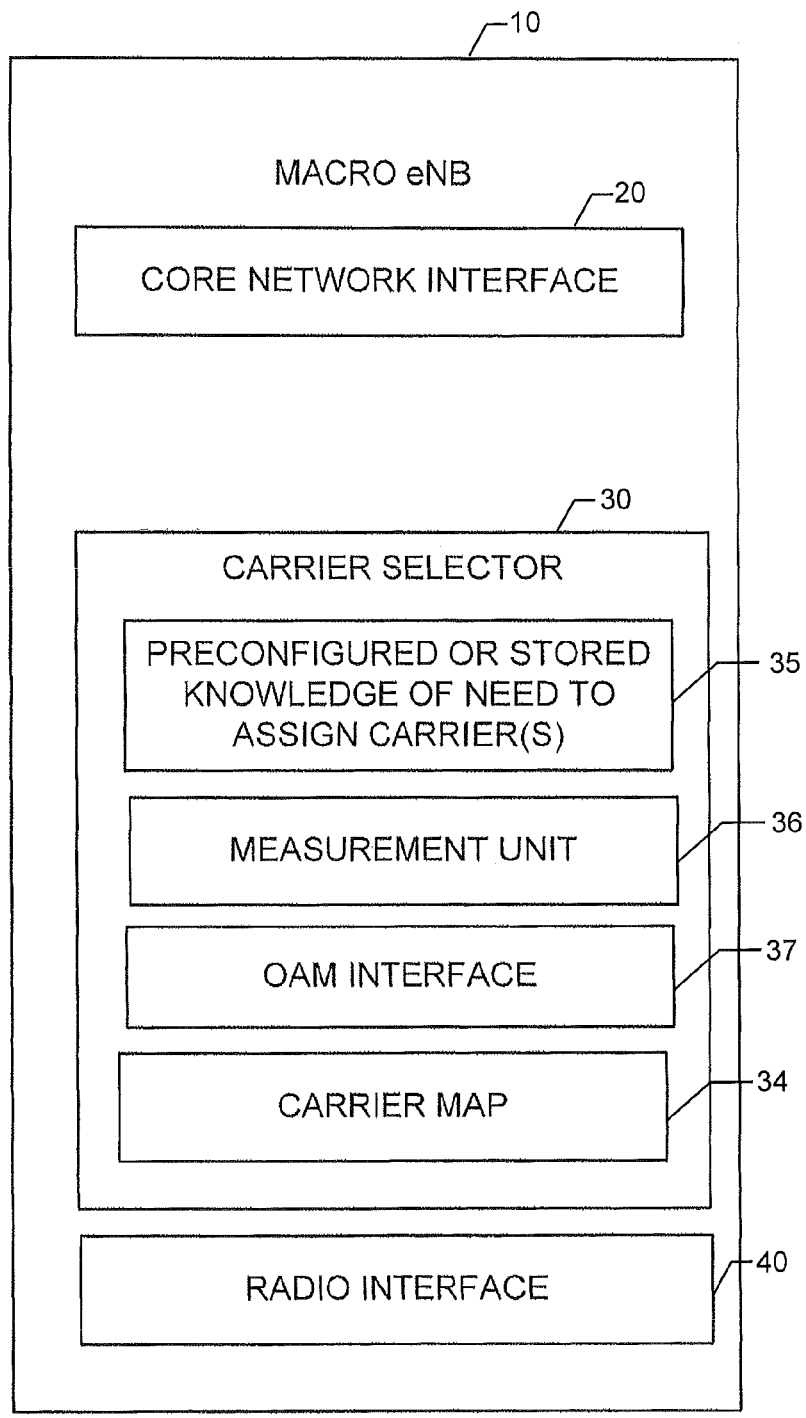
FIG. 9 is a schematic view of a macro base station according to an example embodiment wherein the macro base station is not connected by X2 interface.

FIG. 9 is a schematic view of a macro eNB (e.g., eNB-M 10) according to an example embodiment wherein the macro eNB is not connected by X2 interface. The macro eNB 10 of FIG. 9 comprises a radio interface 40, a core network interface 20, and a carrier selector 30 configured to select, or at least make, a suggestion regarding carrier selection, for eNB-s 200. In an example implementation shown in FIG. 9, the carrier selector 30 comprises a measurement unit 36, an OAM interface 37, a carrier map 34, and a memory or register or the like 35 which maintains preconfigured to stored knowledge of a need to assign carrier(s), e.g., to assign a carrier to Cell-s 202 or to cells within a certain PCI range.

Due to the fact that there is no X2 interface between eNB-M 10 and eNB-s 200, the eNB-M 10 will either be preconfigured with information of whether Cell-s 202 is in need of carrier assignment (e.g. pre-configuration via OAM system signalling Cell-s ECGI to eNB-M 10 together with the type of carrier assignment needed) or the eNB-M 10 knows that all UE-reported cells within a certain PCI range are in need of carrier assignment.

Figure 10:
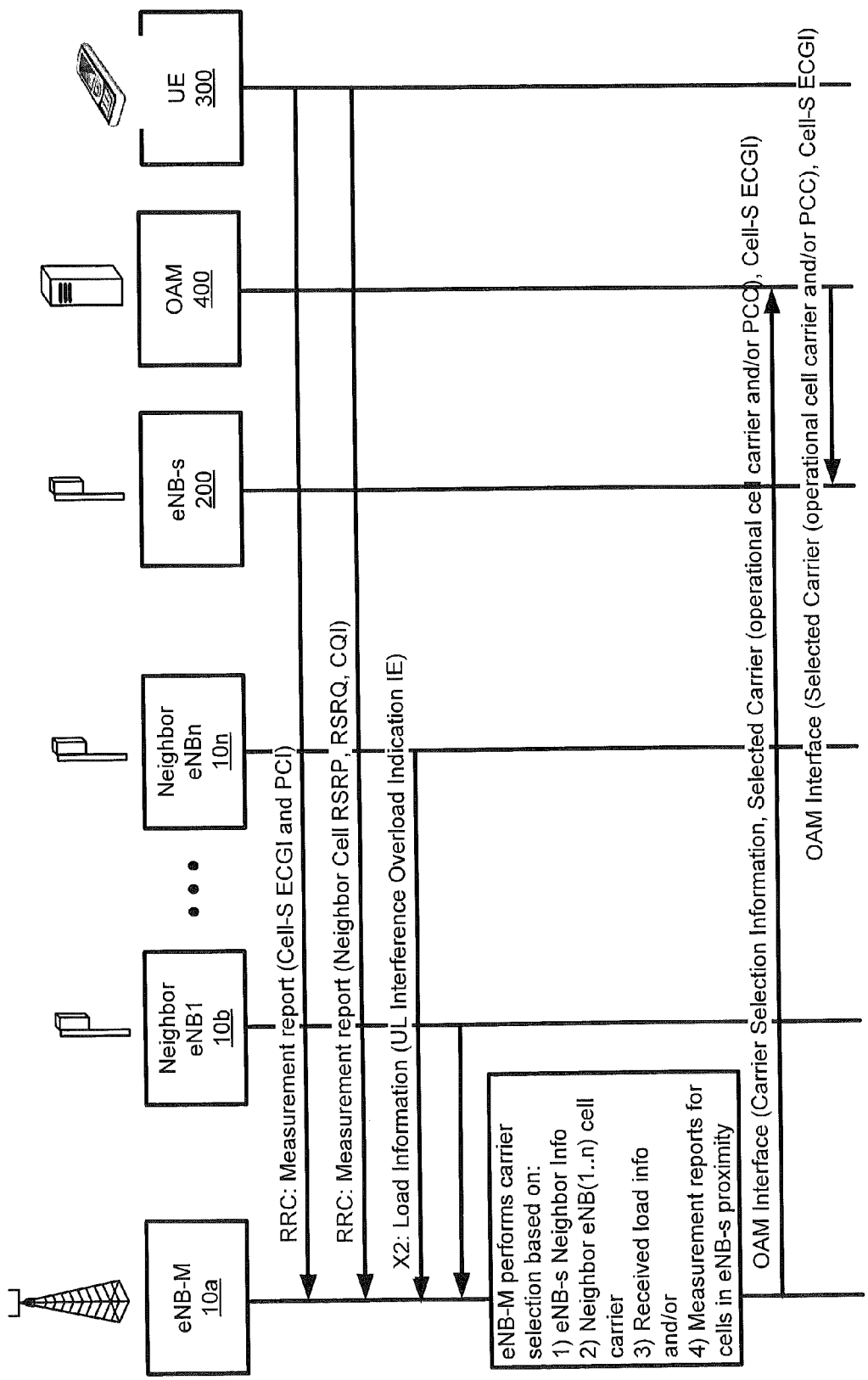
FIG. 10 is a diagrammatic view showing example acts comprising carrier selection for a cell via an Operation and Management (OAM) system.

In one example implementation and scenario illustrated in FIG. 10, the eNB-M 10a knows the neighbour cells of Cell-s 202 by asking a UE 300 which is reporting Cell-s to perform neighbour cells measurements. Due to the lack of an X2 interface between eNB-M 10a and eNB-s 200, eNB-M 10a reports all the information collected and/or the carrier selected for Cell-s 202 to the Operation and Maintenance (OAM) system 400, which consequently assigns the carrier to Cell-s 202. It shall be noted that the OAM system 400 is assumed to know the PCC assigned to cells in the neighbourhood of Cell-s 202. FIG. 10 shows an example message sequence chart for such scenario.

The UE 300 communicates Radio Resource Control (RRC) measurement reports containing Cell-S ECGI and/or PCI information to the eNB-M 10a. Alternatively or additionally, the UE 300 can communicate other RRC measurement reports, such as neighbor cell RSRP, RSRQ, and/or CQI measurement information to the eNB-M 10a. The UE 300 also communicates load information to the eNB-M 10a that can include an uplink (UL) interference overload indication information element (IE).

The eNB-M 10a performs selection of a carrier for use by the eNB-s 200 based on the eNB-s 200 neighbor information, the neighbour cell carrier usage information, received load information, and/or the measurement report(s) for cells in the eNB-s proximity. The eNB-M 10a communicates a message identifying the selected one or more carriers through an OAM interface to the OAM 400. The message can include carrier selection information (e.g., operational cell carrier and/or PCC information) and may further identify Cell-S ECGI. The OAM 400 can forward a corresponding message to the eNB-s 200 through an OAM interface thereto.

Section 3: Carrier Configuration Support from Macro to Small at Installation

In another example embodiment and mode, the eNB-s 200 has some embedded UE type functionality, which means that the eNB-s 200 can scan for covering base stations at different frequencies. Accordingly, the eNB-s 200 can be configured to scan received signals for carriers used by other base stations to identify interfered frequencies. The eNB-s 200 then communicates the identified interfered frequencies directly to the eNB-M 10 and/or communicates the identified interfered frequencies to the OAM 400, which relays corresponding information to the eNB-M 10. The OAM 400 may be configured to select a suitable eNB-M 10 to be associated with the eNB-s 200 based on a list item node type, an intended coverage area of the eNB-s 200 and/or eNB-M 10, base station hardware configuration of the eNB-s 200 and/or eNB-M 10 (e.g., does the base station hardware configuration of the eNB-s 200 and/or eNB-M 10 support operations to compensate for the identified interfered frequencies), base station software configuration of the eNB-s 200 and/or eNB-M 10 (e.g., does the base station software configuration of the eNB-s 200 and/or eNB-M 10 support operations to compensate for the identified interfered frequencies), the identified interfered frequencies, and/or other defined rules and information.

Figure 11:
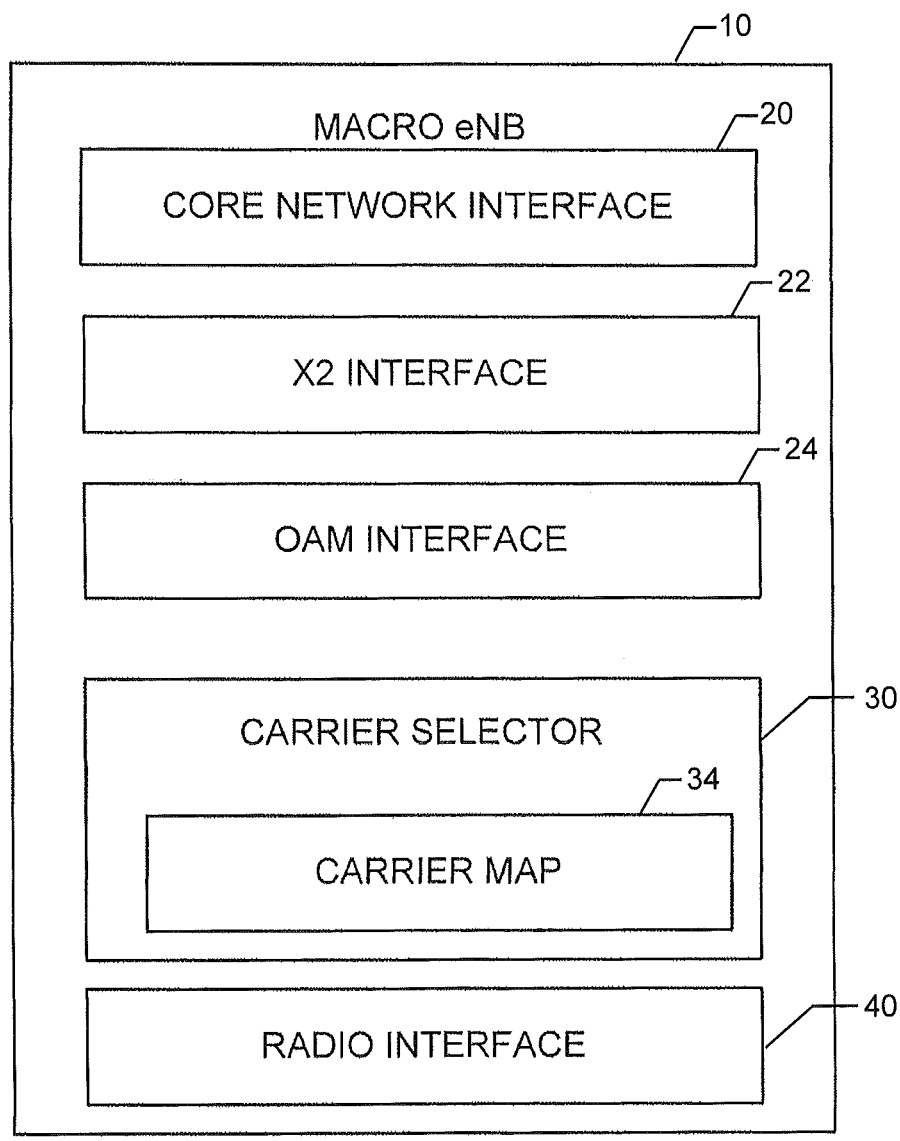
FIG. 11 is a schematic view of a macro base station according to another example embodiment.

FIG. 11 is a schematic view of a macro eNB (e.g., eNB-M 10) according to an example embodiment which has some embedded UE type functionality to scan for covering base stations at different frequencies. The macro eNB 10 of FIG. 11 comprises a radio interface 40, a core network interface 20, an OAM interface 24, an X2 interface 22, and a carrier selector 30. The carrier selector 30 is configured to select, or at least make a suggestion regarding carrier selection, for a eNB-s 200.

Figure 12:
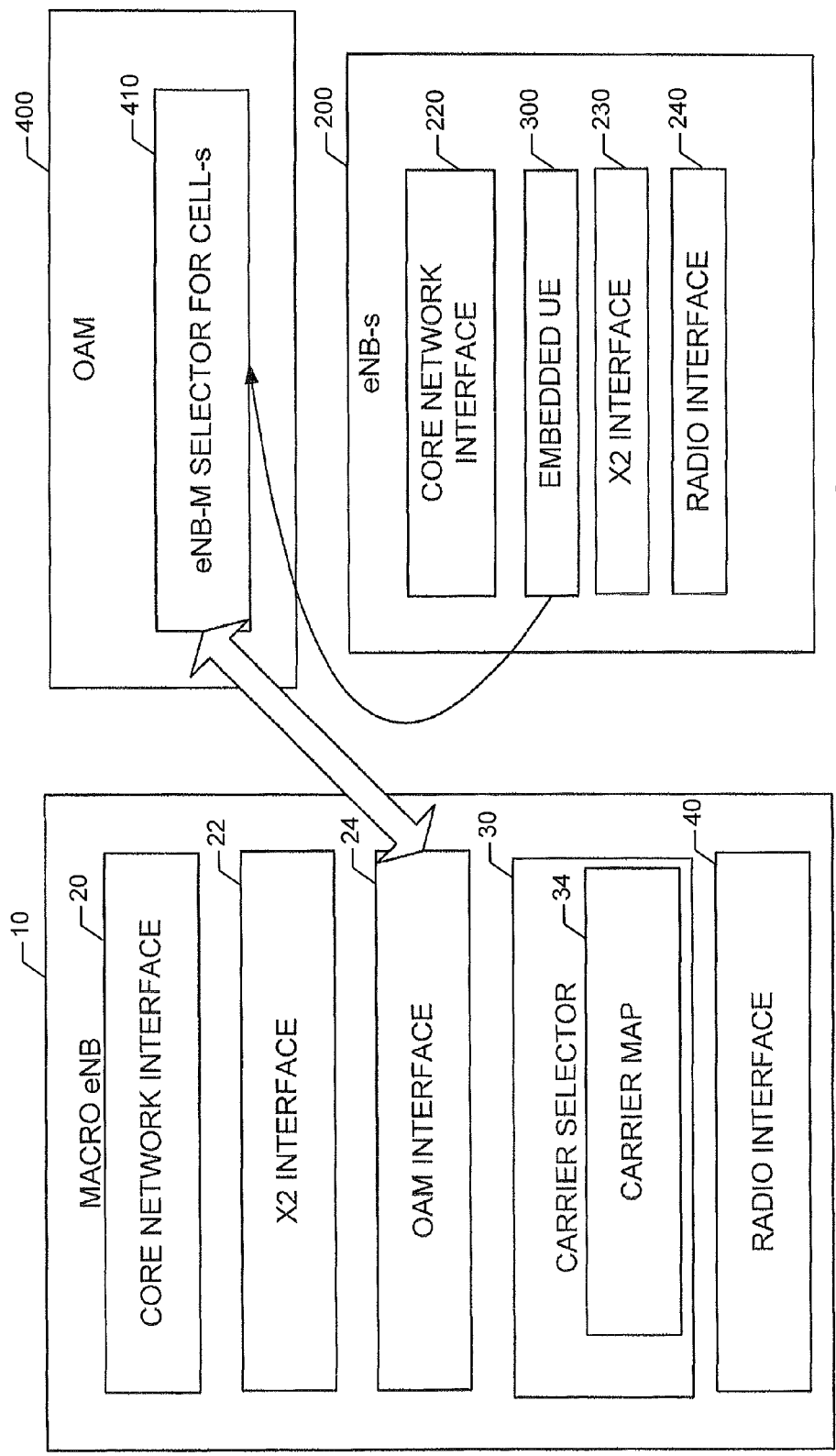
FIG. 12 is a schematic view of, e.g., an OAM unit which comprises a macro base station selector for a small cell and a small base station which comprises an embedded UE.

When the OAM 400 is configured to select a suitable eNB-M 10 to be associated with the eNB-s 200, the OAM 400 can communicate a message to the selected eNB-M 10 that it is associated with a particular eNB-s 200 and thereby acting as support to the eNB-s 200. In this regard, FIG. 12 illustrates, e.g., a OAM unit 400 which comprises a macro base station selector 410 for a small cell, e.g., Cell-s 200. FIG. 12 also shows the small base station (eNB-s) 200 as comprising a radio interface 240, a core network interface 220, and an embedded UE functional unit 300.

Prior to operation with support from the eNB-M 10, the eNB-s 200 establishes an X2 interface to eNB-M 10 based on X2 configuration information that is either obtained via pre-configuration, via the OAM 400, or via an established S1 interface. The X2 interface can be used by the eNB-M 10 to signal a carrier selection to the eNB-s 200. Alternatively, instead of using the X2 interface, the eNB-M 10 can signal the carrier selection for the eNB-s 200 through communications via the OAM 400. For example, the eNB-M 10 can operate as an OAM proxy and adds or changes carrier selection information that is communicated by the OAM 400 to the eNB-s 200.

After receiving notification of the selected carrier(s), the eNB-s 200 begins using the selected carrier(s) to communicate with one or more UEs.

When the eNB-s 200 has embedded UE functionality for scanning for interference, the eNB-s 200 may also communicate downlink (DL) measurement information (e.g. interference, receive pilot power) to the eNB-M 10 that is performing the carrier selection. This information can be provided via an X2 interface and/or via an OAM interface through the OAM 400, and the information is then used by the eNB-M 10 in the carrier selection for Cell-s 202 of the eNB-s 200.

The example embodiment of section 3 thus provides variations of the X2-based embodiment (see section 1) and the OAM-based embodiment (see section 2), with an example difference being that the section 3 embodiment includes a UE type functionality (scanning) within the eNB-s 200 and may perform carrier selection in response to power up of the eNB-s 200.

Figure 13:
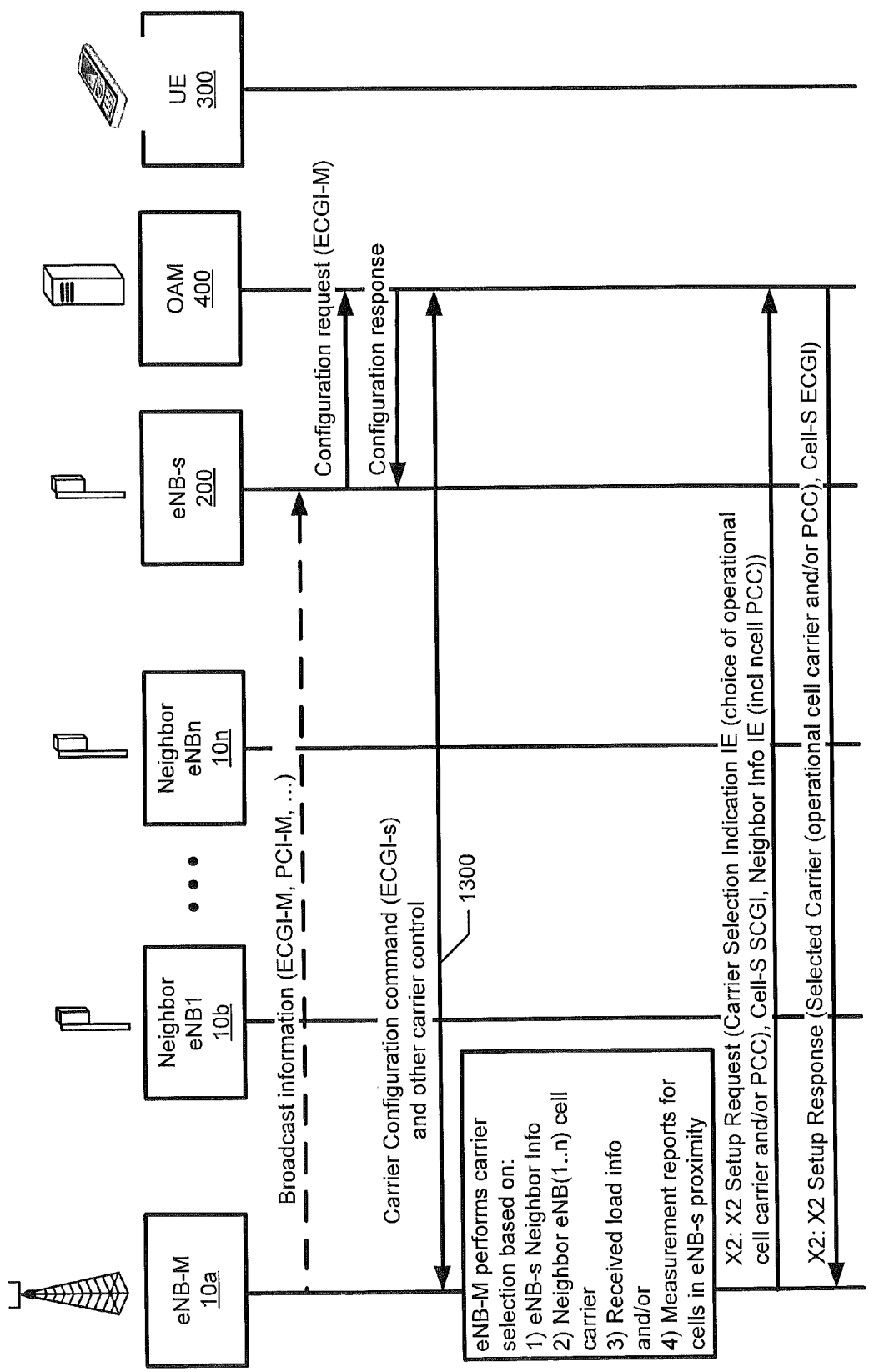
FIG. 13 is a diagrammatic view showing example acts including example signals comprising carrier selection commanded by an Operation and Management (OAM) system and effectuated by a macro base station node.

FIG. 13 illustrates operations and methods for signalling when the OAM 400 is configured to provide message commands to an eNB-M 10a to support carrier selection for a eNB-s 200. Referring to FIG. 13, the eNB-M 10a can broadcast information, such as ECGI-M and PCI-M) to the eNB-s 200. The eNB-s 200 can respond thereto by communicating a configuration request, which can contain the ECGI-M, to the OAM 400. The OAM 410 respond with the configuration response to the eNB-s 200 and with a carrier configuration command (e.g., ECGI-s) to the eNB-M 10. The eNB-M 10a then performs a selection of one or more carriers for use by the eNB-s 200 based on the eNB-s 200 neighbor information, the neighbour cell carrier usage information, received load information, and/or the measurement report(s) for cells in the eNB-s proximity. The eNB-M 10a can communicates the selected one or more carriers to the OAM 400 for communication therefrom to the eNB-s 200.

In one embodiment, the eNB-M 10a can communicates the selected one or more carriers (e.g., operational cell carrier and/or PCC) to the OAM 400 through an X2 Setup Request (e.g., as carrier selection indication information element (IE), Cell-S SGSI, and/or neighbor information IE (e.g., ncell PCC)). The OAM 400 can then communicate a responsive X2

Setup Response to the eNB-M 10a, where the response they identify a selected carrier (e.g., operational cell carrier and/or PCC) and/or Cell-S ECGI.

Figure 14:
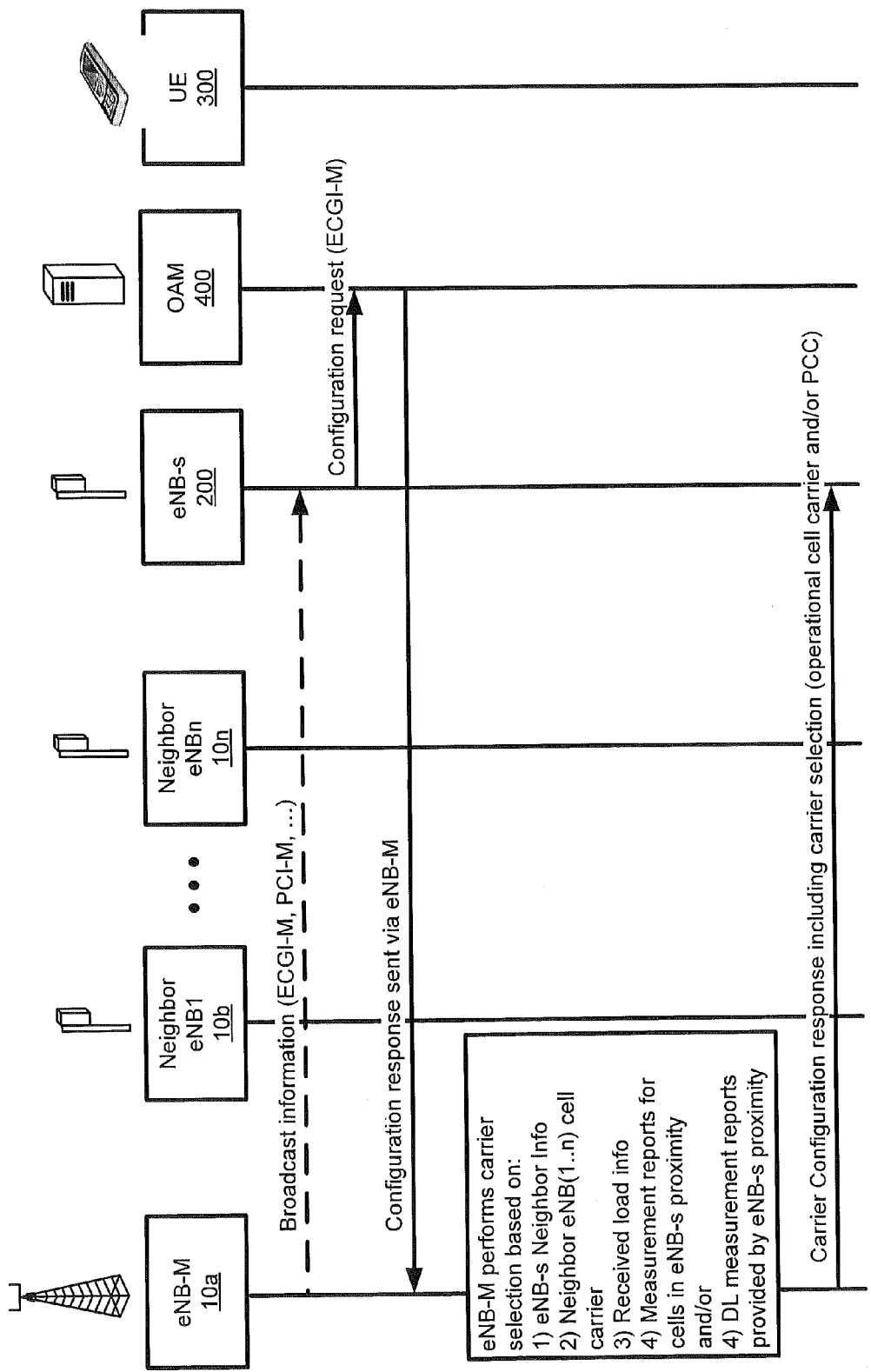
FIG. 14 is a diagrammatic view showing example acts comprising carrier selection for a cell by an Operation and Management (OAM) system proxy in a macro base station node.

In some embodiments, the eNB-M 10a can generate statistics regarding carrier selection decisions by the eNB-M 10a for use by itself and/or regarding carrier selection decisions by the eNB-M 10a for use by the eNB-s 200. The eNB-M 10a can report (message flow 1300 in FIG. 13) the statistics to the OAM 400, and the OAM 400 may use the statistics to control (message flow 1300) carrier selection decisions by the eNB-M 10a. For example, the OAM 400 may control which carriers are considered by the eNB-M 10a for selection for use by the eNB-s 200. When the OAM 400 functions to receive such statistics from a plurality of base stations (e.g., eNBs 10a-10n), the OAM 400 can provide centralized decision making regarding which carriers should or should not be considered for use by the eNB-s 200 and responsively can control carrier selection decisions by the eNB-M 10a (e.g., through the configuration command signalling illustrated in FIG. 13). For example, the OAM 400 may generate a map of carriers that are being used by neighbor base stations of the eNB-s 200 responsive to the statistics reported by a plurality of neighbour base stations, and can use the map of carriers to control (message flow 1300 in FIG. 13) carrier selection decisions by the eNB-M 10a for use by the eNB-s 200. FIG. 14 illustrates operations and methods for signalling when an OAM proxy in an eNB-M 10a supports carrier selection. The operational message flows of FIG. 14 differs from those of FIG. 13 in that the OAM 400 responds to the configuration request from the eNB-s 200 by communicating a configuration response for the eNB-s 200 via the eNB-M 10a. The eNB-M 10a uses the configuration response generating the carrier configuration response including the carrier selection to the eNB-s 200.

Section 4: Reception of Multiple Carrier Assignments from different Macro eNBs

When multiple Macro eNBs (e.g., eNB-Ms 10a, 10b, 10n) serve cells covering the extension of Cell-s 202 of a eNB-s 200, it may occur that more than one of the Macro eNBs could send carrier assignment commands to the same eNB-s 200.

In the case such assignments diverge (i.e. different commands point to different carriers), the eNB-s 200 can be configured to choose only one of the assigned carriers. The eNB-s 200 can be configured to select the carrier based on criteria (e.g., predetermined criteria), and can include, but are not limited to one or more of the strongest macro signal received either by the eNB-s 200 (in case eNB-s is equipped with a UE type functional module for scanning as explained above) or by UEs that are communicatively connected to the eNB-s 200 to provide measurement reports. In an example embodiment and mode, the eNB-s 200 may inform neighbouring Macro eNBs 10 regarding which carrier has been selected.

Figure 15:
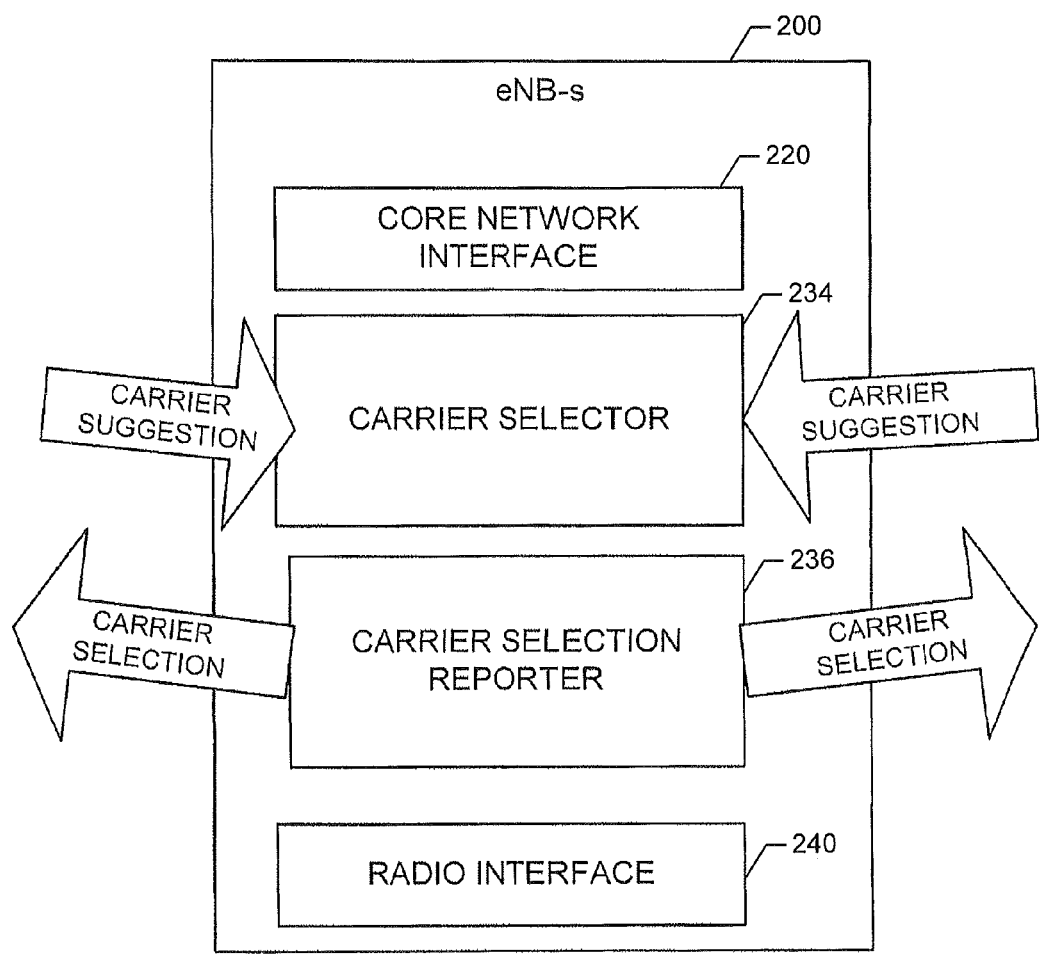
FIG. 15 is a schematic view of a small base station according to an example embodiment which comprises a carrier selector.

FIG. 15 is a schematic view of a small base station (BS) (e.g., eNB-s 200) according to an example embodiment which comprises a carrier selector 234 that is configured to scan for potentially interfering signals from other base stations at different frequencies. As shown in FIG. 15, the carrier selector 234 of the eNB-s 200 may receive carrier suggestions from a plurality of macro base stations 10, and can select one or more of the suggested carriers for its use based on the criteria known to the eNB-s 200. The eNB-s 200 of FIG. 15 is also shown as comprising a carrier selection reporter 236 which communicates the carrier choice of the carrier selector 234 to the macro base stations 10 and/or other base stations which need to know the carrier selection.

Section 5: Electronic Circuitry Embodiments

Figure 16:
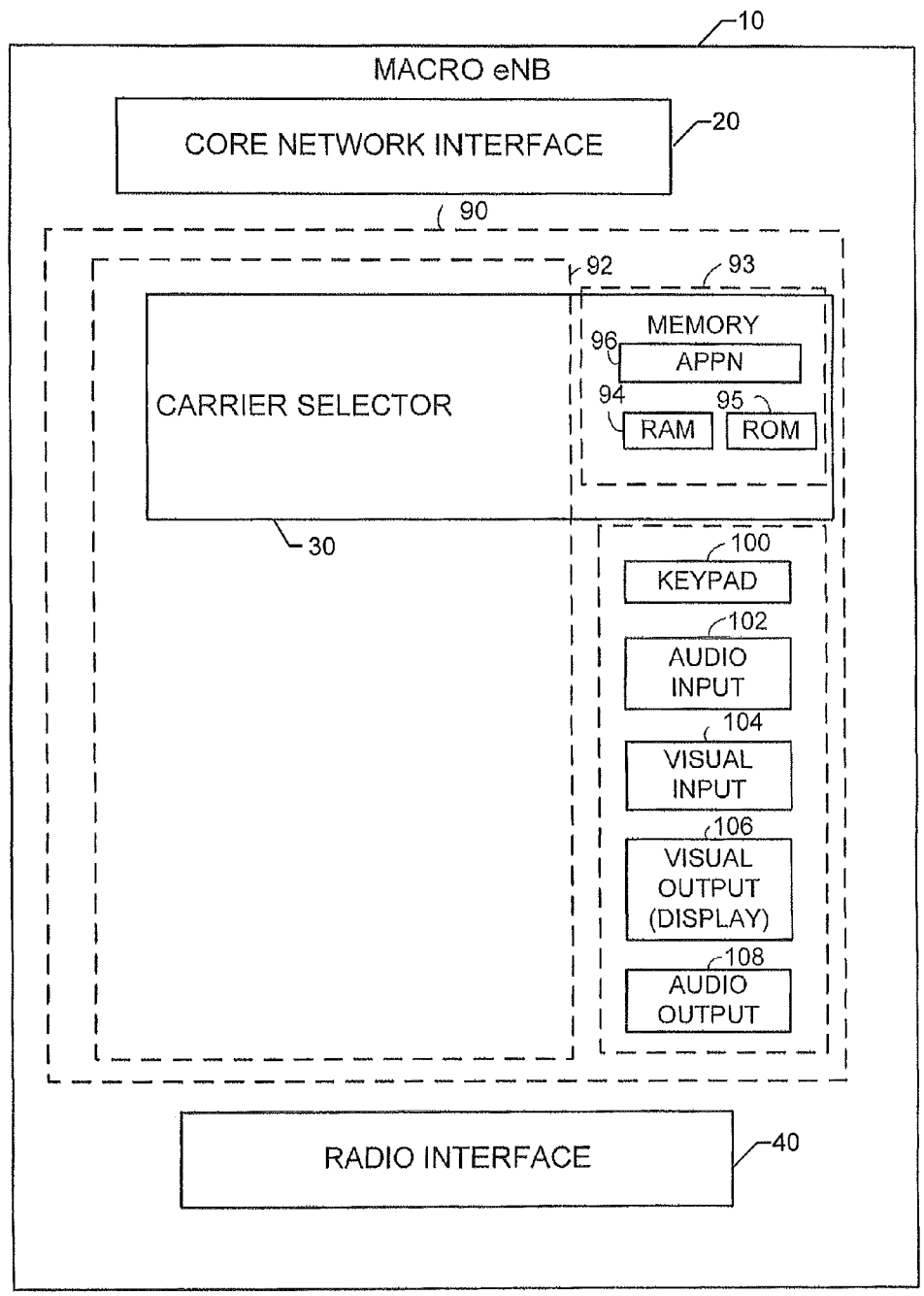
FIG. 16 is a diagrammatic view of portions of another example embodiment of a macro base station node, including a platform implementation.

The above described operations and methods of the various nodes and servers may be performed using electronic circuitry. For example, any of the embodiments of macro base stations (eNB-M) described herein, any of the embodiments of small base stations (eNB-s), or any embodiment of OAM units/nodes/servers herein can be realized by electronic circuitry. As an example of how any of these nodes or servers can be realized by electronic circuitry, FIG. 16 shows an embodiment of an example generic macro base station (eNB-M 10) wherein the carrier selector is realized by electronic circuitry and particularly by platform 90, the platform 90 being framed by broken lines in FIG. 16. The terminology "platform" is a way of describing how the functional units of the base station node can be implemented or realized by machine including electronic circuitry, One example platform 90 is a computer implementation wherein one or more of the framed elements including carrier selector are realized by one or more processors 92 which execute coded instructions and which use non-transitory signals in order to perform the various acts described herein. In such a computer implementation the carrier selector can comprise, in addition to a processor(s), memory section 93 (which in turn can comprise random access memory 94; read only memory 95; application memory 96 (which stores, e.g., coded instructions which can be executed by the processor to perform acts described herein); and any other memory such as cache memory, for example.

Typically the platform 90 of the macro base station also comprises other input/output units or functionalities, some of which are illustrated in FIG. 16, such as keypad 100; audio input device 102 (e.g. microphone); visual input device 104 (e.g., camera); visual output device 106; and audio output device 108 (e.g., speaker). Other types of input/output devices can also be connected to or comprise base station BS.

In the example of FIG. 16 the platform 90 has been illustrated as computer-implemented or computer-based platforms. Another example platform suitable for the carrier selector in particular is that of a hardware circuit, e.g., an application specific integrated circuit (ASIC) wherein circuit elements are structured and operated to perform the various acts described herein.

In at least some example embodiments, the functionality in the eNB-M may run over the existing platform processing layer 2 functionalities.

The technology disclosed herein has been exemplified with E-UTRAN and EPC (i.e. LTE/SAE). However a person skilled in the art will understand that the principles are applicable for other mobile systems as well. For example, similar mechanisms can be considered when the inter-base station signalling is via a network node such as an RNC.

Abbreviations:
3GPP 3$^{rd}$ Generation Partnership Project
CQI Channel Quality Indication
eNodeB E-UTRAN NodeB
eNB E-UTRAN NodeB
EPC Evolved Packet Core
E-UTRAN Evolved UTRAN
HeNB Home eNB
HeNB GW Home eNB Gateway
IE Information Element
LTE Long Term Evolution
MME Mobility Management Entity
O&M Operation and Maintenance
PLMN Public Land Mobile Network
RAN Radio Access Network
RSRP Reference Signal Received Power RSRQ Reference Signal Received Quality
RRC Radio Resource Control
S1 Interface between eNB and CN.
S1AP S1 Application Protocol
S1-MME Control Plane of S1.
UE User Equipment
UTRAN Universal Terrestrial Radio Access Network
X2 Interface between eNBs Further Definitions and Embodiments:

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Exemplary embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention. Moreover, it is not necessary for a device or method to address each and every problem sought to be solved by the technology disclosed herein, for it to be encompassed hereby. Furthermore, no element, component, or method step in the present disclosure is intended to be dedicated to the public. No claim element herein is to be construed under the provisions of 35 U.S.C. 112, sixth paragraph, unless the element is expressly recited using the phrase "means for."

The invention claimed is:

1. A method by a first base station that provides a served cell that at least partially overlaps a served cell of a second base station, where the first and second base stations are part of a telecommunications system, the method comprising:
    receiving measurement information from at least one user equipment node operating in the served cell of the first base station that identifies measurements of frequencies by the at least one user equipment node;
    identifying at least one carrier that is preferable for the second base station to utilize for communications with the at least one user equipment node to avoid interference in response to the measurement information;
    communicating an instruction message from the first base station to the second base station that instructs the second base station to use the at least one carrier for communications;
    generating statistics regarding carrier selection decisions by the first base station for use by the second base station; and
    communicating the statistics to an Operation and Management system.

2. The method of claim 1, further comprising:
    operating the first base station to provide the served cell with a coverage area that is larger than the served cell of the second base station and that completely overlaps the served cell of the second base station.

3. The method of claim 1, wherein identifying the at least one carrier comprises:
    receiving neighbor carrier usage information from a third base station providing a neighbor cell, the neighbor carrier usage information identifying carriers used by the third base station; and
    selecting the at least one carrier for use by the second base station in response to the neighbor carrier usage information.

4. The method of claim 3, wherein receiving neighbor carrier usage information from the third base station comprises:
    receiving the neighbor carrier usage information as an information element of an X2 Setup Request/Response message during setup of an X2 interface with the third base station and/or as an information element of a configuration update message received from the third base station through the X2 interface.

5. The method of claim 3, wherein receiving neighbor carrier usage information from the third base station comprises:
    receiving the neighbor carrier usage information as an information element of an S1 Setup communication during setup of an S1 interface with the third base station.

6. The method of claim 3, wherein identifying the at least one carrier further comprises:
    receiving the neighbor carrier usage information from a plurality of neighbor base stations;
    generating a map of carriers that are being used by the neighbor base stations responsive to the neighbor carrier usage information; and
    selecting among non-used carriers present within the map of carriers to identify the at least one carrier that is preferable for the second base station to utilize for communications with the at least one user equipment node to avoid interference with the plurality of neighbor base stations.

7. The method of claim 1,
    wherein receiving measurement information from the at least one user equipment node comprises receiving the measurement information in response to generation of a measurement report by the user equipment node; and
    further comprising communicating a report control message to the user equipment node that controls timing of the generation of the measurement report, controls selection of which of a plurality of neighbor cells are measured by the user equipment node, and/or controls which frequency band is measured by the user equipment node for inclusion in generation of the measurement report.

8. The method of claim 1, wherein receiving measurement information from at least one user equipment node comprises:
    receiving the measurement information in response to a measurement by the user equipment node of a Reference Signal Received Power, a Reference Signal Received Quality, and/or a Channel Quality Indication.

9. The method of claim 1, wherein identifying the at least one carrier comprises:
    estimating interference to the second base station based on carriers used by the first base station to communicate with at least one user equipment node; and
    selecting the at least one carrier for use by the second base station in response to the estimated interference.

10. The method of claim 1, wherein identifying the at least one carrier comprises:
    identifying at least one carrier that the first base station wants to protect from interference from another base station; and
    selecting the at least one carrier for use by the second base station to not overlap the identified at least one carrier that the first base station wants to protect from interference.

11. The method of claim 1, wherein communicating the instruction message to the second base station comprises:
    communicating the instruction message to the second base station through an X2 interface that communicatively connects the first and second base stations.

12. The method of claim 1, wherein communicating the instruction message to the second base station comprises:
    communicating the instruction message to a networked Operation and Maintenance system through a core network for forwarding of a corresponding instruction message to the second base station.

13. A method by a first base station that provides a served cell that at least partially overlaps a served cell of a second base station, where the first and second base stations are part of a telecommunications system, the method comprising:
    receiving measurement information from at least one user equipment node operating in the served cell of the first base station that identifies measurements of frequencies by the at least one user equipment node;

identifying at least one carrier that is preferable for the second base station to utilize for communications with the at least one user equipment node to avoid interference in response to the measurement information;

communicating an instruction message from the first base station to the second base station that instructs the second base station to use the at least one carrier for communications, wherein communicating the instruction message to the second base station comprises initiating communication of the instruction message to the second base station in response to a X2 Setup Request/Response message received from the second base station during setup of an X2 interface with the second base station and/or in response to a configuration update message received from the second base station through the X2 interface.

14. The method of claim 1, wherein identifying the at least one carrier comprises:

scanning received signals for carriers used by other base stations to identify interfered frequencies; and selecting the at least one carrier for use by the second base station to avoid the identified interfered frequencies.

15. The method of claim 13, further comprising:

receiving an instruction message containing carrier control information from the Operation and Management system; and controlling the identifying of the least one carrier that is preferable for the second base station to utilize for communications with the at least one user equipment node responsive to the instruction message from the Operation and Management system.

16. A method by a first base station that provides a served cell that is at least partially overlapped by a served cell of a second base station, where the first and second base stations are part of a telecommunications system, the method comprising:

receiving an instruction message from at least one user equipment node operating in the served cell of the first base station that identifies frequencies detected by the at least one user equipment node as being used by at least one neighbor cell;

communicating neighbor carrier usage information from the first base station to the second base station in response to the interference information;

receiving an instruction message from the second base station that instructs the first base station to use at least one identified carrier, wherein the at least one identified carrier in the instruction message is identified based on selection by the second base station in response to the neighbor carrier usage information; and communicating with the at least one user equipment node using the at least one identified carrier.

17. The method of claim 16, further comprising:

communicating neighbor carrier usage information from the first base station to the second base station, the neighbor carrier usage information identifying carriers used by a third base station providing a neighbor cell, wherein the second base station selects the at least one identified carrier, which is then communicated to the first base station through the instruction message, in response to the neighbor carrier usage information.

18. A first base station of a telecommunications system that includes a second base station and a control element node (MME/S-GW), the first base station comprising:

a core network interface that communicatively connects the first base station to the control element node (MME/S-GW);

an X2 interface that communicatively connects the first base station to the second base station;

a radio interface that provides a served cell for communications with at least one user equipment node, wherein the served cell at least partially overlaps a served cell of the second base station; and a carrier suggestion generator that selects at least one carrier for use by the second base station in response to neighbor carrier usage information that identifies carriers used by another base station and/or in response to interference information received from the at least one user equipment node that identifies frequencies detected by the at least one user equipment node as being used by another base station, that identifies at least one carrier that is preferable for the second to utilize for communications with the at least one user equipment node to avoid interference, and that communicates an instruction message through the core network interface and/or the X2 interface to the second base station that instructs the second base station to use the at least one carrier for communications by performing operations comprising initiating communication of the instruction message to the second base station in response to a X2 Setup Request/Response message received from the second base station during setup of an X2 interface with the second base station and/or in response to a configuration update message received from the second base station through the X2 interface.

19. The method of claim 1, wherein identifying the at least one carrier comprises identifying two or more carriers.

20. The method of claim 1, wherein identifying the at least one carrier comprises identifying two or more carriers that are within a Primary Cell Identities (PCI) range of carriers of the second base station.

* * * * *

UNITED STATES PATENT AND TRADEMARK OFFICE
CERTIFICATE OF CORRECTION

| | | |
|---|---|---|
| PATENT NO. | : 8,942,745 B2 | Page 1 of 1 |
| APPLICATION NO. | : 13/502964 | |
| DATED | : January 27, 2015 | |
| INVENTOR(S) | : Centonza et al. | |

It is certified that error appears in the above-identified patent and that said Letters Patent is hereby corrected as shown below:

On the Title Page, in item (73), under "Assignee", in Column 1, Line 1, delete "L M." and insert -- L M --, therefor.

In the Specification

In Column 14, Line 52, delete "OAM 410" and insert -- OAM 400 --, therefor.

In Column 14, Line 66, delete "ncell" and insert -- cell --, therefor.

In Column 15, Line 38, delete "10a, 10b, 10n)" and insert -- 10a, 10b, . . . 10n) --, therefor.

In Column 16, Line 16, delete "circuitry," and insert -- circuitry. --, therefor.

In Column 16, Line 23, delete "(which in" and insert -- which in --, therefor.

In the Claims

In Column 21, Line 39, in Claim 16, delete "receiving an instruction message" and insert -- receiving interference information --, therefor.

In Column 22, Line 32, in Claim 18, delete "second to" and insert -- second base station to --, therefor.

Signed and Sealed this
Seventh Day of July, 2015

Michelle K. Lee
*Director of the United States Patent and Trademark Office*